United States Patent
Zhu et al.

(10) Patent No.: US 11,381,956 B2
(45) Date of Patent: Jul. 5, 2022

(54) OBTAINING OF UE POLICY

(71) Applicant: HUAWEI TECHNOLOGIES CO., LTD., Guangdong (CN)

(72) Inventors: Fangyuan Zhu, Beijing (CN); Yan Li, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 196 days.

(21) Appl. No.: 16/897,548

(22) Filed: Jun. 10, 2020

(65) Prior Publication Data

US 2020/0304983 A1  Sep. 24, 2020

Related U.S. Application Data

(63) Continuation of application No. PCT/CN2018/120226, filed on Dec. 11, 2018.

(30) Foreign Application Priority Data

Dec. 13, 2017  (CN) .......................... 201711330705.X

(51) Int. Cl.
    *H04W 8/08* (2009.01)
    *H04W 8/14* (2009.01)
(52) U.S. Cl.
    CPC .............. *H04W 8/082* (2013.01); *H04W 8/14* (2013.01)
(58) Field of Classification Search
    CPC ......... H04W 8/082; H04W 8/14; H04W 8/24; H04W 8/26; H04W 36/00; H04L 41/0893
    See application file for complete search history.

(56) References Cited

U.S. PATENT DOCUMENTS

2011/0071859 A1    3/2011  Keefer
2019/0289080 A1*   9/2019  Rao ..................... H04L 65/1076

FOREIGN PATENT DOCUMENTS

| CN | 101217383 A | 7/2008 |
| CN | 106375987 A | 2/2017 |
| CN | 106982458 A | 7/2017 |
| EP | 2 725 831 A1 | 4/2014 |

(Continued)

OTHER PUBLICATIONS

Huawei et al., "Network Slice instance selection", S2-175296, SA WG2 Meeting #122, Jun. 26-30, 2017, Cabo, Mexico, total 22 pages.

(Continued)

*Primary Examiner* — Fred A Casca
(74) *Attorney, Agent, or Firm* — WHDA, LLP

(57) ABSTRACT

A UE policy obtaining method includes receiving, by a first PCF network element in a VPLMN, a first URSP of an HPLMN that includes a first rule from a second PCF network element in the HPLMN, and sending, to a UE, a second URSP of the VPLMN that includes a second rule and a third rule. The first rule is used to indicate an association between first S-NSSAI, a first application, and a first DNN, the first DNN being used to identify a first DN, and the first DN allowing LBO and supporting the first application and a second application. The second rule is used to indicate an association between second S-NSSAI, the first application, and the first DNN. The third rule is used to indicate an association between the second S-NSSAI, the second application, and the first DNN.

20 Claims, 11 Drawing Sheets

(56) References Cited

FOREIGN PATENT DOCUMENTS

| EP | 2036378 B1 | 2/2015 |
| EP | 2223556 B1 | 4/2016 |
| WO | 2007079682 A1 | 7/2007 |
| WO | 2013056368 A1 | 4/2013 |
| WO | 2015020446 A1 | 2/2015 |
| WO | 2015038997 A1 | 3/2015 |
| WO | 2015039059 A1 | 3/2015 |
| WO | 2017034352 A1 | 3/2017 |
| WO | 2017053742 A1 | 3/2017 |
| WO | 2017113100 A1 | 7/2017 |
| WO | 2017175714 A1 | 10/2017 |

OTHER PUBLICATIONS

Huawei et al.,"23.503: Clarif''ication on URSP" SA WG2 Meeting #124, S2-178890, Nov. 27-Dec. 1, 2017, Reno, Nevada, USA, total 10 pages.

3GPP TS 23.501 V1.3.0(Sep. 2017),3rd Generation Partnership Project;Technical Specification Group Services and System Aspects;System Architecture for the 5G System;Stage 2(Release 15), total 176 pages.

3GPP TS 23.503 V1.0.0 (Dec. 2017), 3rd Generation Partnership Project;Technical Specification Group Services and System Aspects;Policy and Charging Control Framework for the 56 System;Stage 2(Release 15), total 56 pages.

Extended (Supplementary) European Search Report dated Dec. 18, 2020, issued in counterpart EP Application No. 18889766.4 (12 pages).

Nokia et al.,"23.50x: Moving Reference architecture and Interactions between PCF and NFs from 501 Annex A to the new PCC TS 5.1 and 5.2 with the alignment with 23.501", SA WG2 Meeting #122E, e-meeting S2-176749, Sep. 11-15, 2017, Elbonia, total 9 pages.

Office Action dated Feb. 1, 2021, issued in counterpart CN Application No. 201711330705.X, with English Translation. (23 pages).

Office Action dated Jun. 29, 2021, issued in counterpart IN application No. 202017024797. (7 pages).

Wang Qingyang et al., Key technology and standardization progress for 5G. Telecommunications Science, 2017, 11 pages, with English Abstract.

International Search Report dated Mar. 1, 2019, issued in counterpart Application No. PCT/CN2018/120226, with partial English translation (12 pages total).

* cited by examiner

OBTAINING OF UE POLICY

CROSS-REFERENCE TO RELATED APPLICATIONS

This application is a continuation of International Patent Application No. PCT/CN2018/120226, filed on Dec. 11, 2018, which claims priority to Chinese Patent Application No. 201711330705.X, filed on Dec. 13, 2017. The disclosures of the aforementioned applications are hereby incorporated by reference in their entireties.

TECHNICAL FIELD

The present invention relates to the field of communications technologies, and in particular, to a UE policy obtaining method, apparatus, and system.

BACKGROUND

In the 5th generation (5G) communications era, hundreds of billions of internet of things devices access a network, and requirements for the network in different types of application scenarios are differentiated. In a network slicing technology, network environments isolated from each other are provided for the different application scenarios by virtualizing an independent logical network on a same network infrastructure, so that network functions and characteristics can be customized for the different application scenarios based on respective requirements to ensure requirements of different services. In the 5G communications era, there are a plurality of applications (APP) on user equipment. Because different APPs have different requirements on a latency and bandwidth, network slice types required when a user starts different APPs are different. Different network slice types may be identified by using network slice identification information. For example, the network slice identification information is single network slice selection assistance information (S-NSSAI).

Currently, the user equipment may obtain a UE route selection policy (URSP) from a 5G core network, and then determine, based on the URSP, how to route a service flow to an existing packet data unit (PDU) session, or how to trigger establishment of a new PDU session based on the URSP. When the user equipment starts different APPs and needs to establish a new PDU session, because a network slice selection policy (NSSP) in the URSP includes S-NSSAI corresponding to the different APPs, the user equipment may select, based on a correspondence between an APP and S-NSSAI, a network slice that can meet a requirement of an APP, and establish the session.

In the prior art, a URSP of a visited public land mobile network (VPLMN) in the user equipment is generated based on a URSP of a home public land mobile network (HPLMN) and a mapping relationship between S-NSSAI in the VPLMN and S-NSSAI in the HPLMN. Therefore, the user equipment may fail to obtain, based on the URSP of the VPLMN, information about an APP that can be locally used in the VPLMN, and the user equipment cannot use the APP in the VPLMN. Consequently, service experience of a user deteriorates.

For example, a server that provides a service for an application (for example, Facebook) is deployed in the US, but is not deployed in China. Therefore, user equipment cannot access the server of the application and cannot use the application in China. When a user of China Mobile roams to an area served by an operator (for example, Vodafone) in the US, a URSP obtained by the user of China Mobile in the US does not include information about the application. Therefore, the user cannot use the application in the US. Consequently, user experience deteriorates.

SUMMARY

Embodiments of the present invention provide a UE policy obtaining method, apparatus, and system.

According to an aspect, an embodiment of this application provides a UE policy obtaining method, and the method includes:

A first policy control function network element (for example, a first PCF network element) in a VPLMN receives a first UE policy (for example, a first URSP) of an HPLMN from a second policy control function network element (for example, a second PCF network element) in the HPLMN. The first UE policy includes a first rule, the first rule is used to indicate an association between first network slice identification information (for example, first S-NSSAI), a first application, and first data network identification information (for example, a first DNN), and the first data network identification information is used to identify a first data network (for example, a first DN). The first data network allows LBO and supports the first application and a second application. The first policy control function network element sends a second UE policy (for example, a second URSP) of the VPLMN to user equipment. The second UE policy includes a second rule and a third rule, the second rule is used to indicate an association between second network slice identification information (for example, second S-NSSAI), the first application, and the first data network identification information, and the third rule is used to indicate an association between the second network slice identification information, the second application, and the first data network identification information.

According to the foregoing method, the second UE policy of the VPLMN that is obtained by the user equipment includes information about an APP that does not exist in the first UE policy of the HPLMN but can be used in an LBO scenario of the VPLMN, for example, information about the second application. The user equipment can use more APP services in the LBO scenario of the VPLMN based on the second UE policy obtained in this solution, thereby improving user experience.

In a possible design, the first policy control function network element further sends an identifier of the VPLMN to the user equipment. The identifier of the VPLMN is associated with the second UE policy. Therefore, when moving from another area to the VPLMN, the user equipment can learn of the second UE policy based on the identifier of the VPLMN, so that the user equipment is prevented from requesting to obtain the second UE policy again, and interaction between the user equipment and the network can be reduced, thereby reducing a latency and improving efficiency.

In a possible design, the first policy control function network element further sends the first UE policy and an identifier of the HPLMN to the user equipment. The identifier of the HPLMN is associated with the first UE policy. In this way, the user equipment can obtain the first UE policy and the identifier of the HPLMN. Therefore, when moving from another area to the HPLMN and starting an APP, the user equipment can learn of the first URSP based on the identifier of the HPLMN, so that the user equipment is prevented from requesting to obtain the first UE policy, and interaction between the user equipment and the network can be reduced, thereby reducing a latency and improving efficiency.

In a possible design, before sending the first UE policy and the identifier of the HPLMN to the user equipment, the first policy control function network element receives instruction information from the second policy control function network element. The instruction information is used to trigger sending of the first UE policy and the identifier of the HPLMN to the user equipment. Therefore, the first policy control function network element can learn of a scenario in which the user equipment does not have the first UE policy. In this scenario, the instruction information triggers the first policy control function network element to send the first UE policy and the identifier of the HPLMN to the user equipment. In this way, the user equipment is prevented from repeatedly obtaining the first UE policy, and interaction between the user equipment and the network can be reduced, thereby reducing a latency.

In a possible design, the method further includes: adding, by the first policy control function network element, a fourth rule to the first UE policy. The fourth rule includes an association between the first network slice identification information, the second application, and the first data network identification information. The first policy control function network element determines the second UE policy based on the first UE policy to which the fourth rule is added. Therefore, the second UE policy includes information about an APP that does not exist in the first UE policy of the HPLMN but can be used in the LBO scenario of the VPLMN.

In a possible design, the method further includes: determining, by the first policy control function network element, that the first data network allows LBO, and determining that the first data network supports the second application. Therefore, the first policy control function network element can learn of the first data network that allows LBO, and further determine the second application supported by the first data network.

In a possible design, when the second network slice identification information is the same as the first network slice identification information, the second UE policy is the first UE policy to which the fourth rule is added. Therefore, the first policy control function network element can generate the second UE policy based on the first UE policy to which the fourth rule is added.

In a possible design, when the second network slice identification information corresponds to the first network slice identification information, that the first policy control function network element determines the second UE policy based on the first UE policy to which the fourth rule is added includes: receiving, by the first policy control function network element from an access and mobility management function network element (for example, an AMF network element) in the VPLMN, a first mapping relationship between the first network slice identification information and the second network slice identification information, and determining the second UE policy based on the first mapping relationship and the first UE policy to which the fourth rule is added. Therefore, the first policy control function network element can generate the second UE policy based on the first UE policy to which the fourth rule is added and the first mapping relationship.

In a possible design, the determining the second UE policy based on the first mapping relationship and the first UE policy to which the fourth rule is added includes: mapping, by the first policy control function network element to the second network slice identification information based on the first mapping relationship and the first network slice identification information in the first UE policy to which the fourth rule is added, to generate the second UE policy. Therefore, when the second network slice identification information corresponds to the first network slice identification information, the first policy control function network element maps the first network slice identification information to the second network slice identification information, to generate the second UE policy.

In a possible design, the method further includes: receiving, by the first policy control function network element, a first mapping relationship between the first network slice identification information and the second network slice identification information from an access and mobility management function network element in the VPLMN, where the first mapping relationship is used to generate the second UE policy. Therefore, when the second network slice identification information corresponds to the first network slice identification information, the first policy control function network element maps, based on the obtained first mapping relationship, the network slice identification information in the HPLMN to the network slice identification information in the VPLMN, to generate the second UE policy.

In a possible design, the first UE policy further includes a fifth rule. The fifth rule is used to indicate an association between third network slice identification information, a third application, and second data network identification information, the second data network identification information is used to identify a second data network, and the second data network prohibits LBO. The second UE policy further includes a sixth rule, and the sixth rule is used to indicate an association between fourth network slice identification information, the third application, and the second data network identification information. The fourth network slice identification information is the same as the third network slice identification information.

In a possible design, the first UE policy further includes a fifth rule. The fifth rule is used to indicate an association between third network slice identification information, a third application, and second data network identification information, the second data network identification information is used to identify a second data network, and the second data network prohibits LBO. The second UE policy further includes a sixth rule, and the sixth rule is used to indicate an association between fourth network slice identification information, the third application, and the second data network identification information. The fourth network slice identification information corresponds to the third network slice identification information. Therefore, the second UE policy further includes an application supported by a data network that prohibits LBO, so that the user equipment can further use, in the VPLMN, an application that cannot be used in the LBO scenario.

In a possible design, the method further includes: receiving, by the first policy control function network element, a second mapping relationship between the third network slice identification information and the fourth network slice identification information from the access and mobility management function network element in the VPLMN; and determining the fourth network slice identification information based on the third network slice identification information and the second mapping relationship. Therefore, when the fourth network slice identification information corresponds to the third network slice identification information, the first policy control function network element maps, based on the obtained second mapping relationship, the network slice identification information in the HPLMN to the network slice identification information in the VPLMN, so that the generated second UE policy further includes the application supported by the data network that prohibits LBO.

According to another aspect, this application further discloses a UE policy obtaining method. The method includes: sending, by a second policy control function network element (for example, a second PCF network element) in an HPLMN, a UE policy (for example, a URSP) of the HPLMN to a first policy control function network element (for example, a first PCF network element) in a VPLMN; and sending, by the second policy control function network element, instruction information to the first policy control function network element. The instruction information is used to trigger sending of a UE policy and an identifier of the HPLMN to user equipment, and the identifier of the HPLMN is associated with the UE policy.

According to the foregoing method, the first policy control function network element in the VPLMN can receive the UE policy of the HPLMN, and generate a UE policy of the VPLMN based on the UE policy of the HPLMN. The UE policy of the VPLMN includes information about an APP that does not exist in the UE policy of the HPLMN but can be used in an LBO scenario of the VPLMN. The user equipment can use more APP services in the LBO scenario of the VPLMN based on the obtained second UE policy, thereby improving user experience. In addition, after being triggered by the instruction information, the first policy control function network element in the VPLMN sends the UE policy and the identifier of the HPLMN to the user equipment, so that the user equipment is prevented from repeatedly obtaining the UE policy of the HPLMN, and interaction between the user equipment and the network can be reduced, thereby reducing a latency.

According to another aspect, this application further discloses a UE policy obtaining method. The method includes: sending, by an access and mobility management function network element (for example, an AMF network element) in a VPLMN, a mapping relationship between first network slice identification information (for example, first S-NSSAI) and second network slice identification information (for example, second S-NSSAI) to a policy control function network element (for example, a PCF network element) in the VPLMN. The first network slice identification information is network slice identification information (for example, S-NS SAI) that is in an HPLMN and that is supported by a data network (for example, a DN), the second network slice identification information is network slice identification information that is in the VPLMN and that is supported by the data network, and the mapping relationship is used to determine the second network slice identification information.

In the prior art, user equipment needs to obtain the mapping relationship between the first network slice identification information and the second network slice identification information from the access and mobility management function network element in the VPLMN, to generate a second UE policy. According to the prior art, the user equipment perceives a roaming agreement between the VPLMN and the HPLMN by using the mapping relationship. However, according to the foregoing method provided in this application, the user equipment obtains the second UE policy from a network side, so that the user equipment does not need to perceive the roaming agreement between the VPLMN and the HPLMN, thereby improving network security performance.

According to another aspect, an embodiment of this application provides a UE policy obtaining apparatus. The UE policy obtaining apparatus has a function of implementing behavior of the first policy control function network element (for example, the first PCF network element) in the foregoing methods. The functions may be implemented by hardware, or may be implemented by hardware by executing corresponding software. The hardware or software includes one or more modules corresponding to the foregoing functions. In a possible design, a structure of the UE policy obtaining apparatus includes a processor and a transceiver. The processor is configured to perform a corresponding function of the UE policy obtaining apparatus in the foregoing methods. The transceiver is configured to implement communication between the UE policy obtaining apparatus and a second policy control function network element/an access and mobility management function network element/ user equipment. The UE policy obtaining apparatus may further include a memory. The memory is configured to be coupled to the processor, and the memory stores a program instruction and data that are necessary for the UE policy obtaining apparatus.

According to another aspect, an embodiment of this application provides a UE policy obtaining apparatus. The UE policy obtaining apparatus has a function of implementing behavior of the second policy control function network element (for example, the second PCF network element) in the foregoing methods. The functions may be implemented by hardware, or may be implemented by hardware by executing corresponding software. The hardware or software includes one or more modules corresponding to the foregoing functions. In a possible design, a structure of the UE policy obtaining apparatus includes a processor and a transceiver. The processor is configured to perform a corresponding function of the UE policy obtaining apparatus in the foregoing methods. The transceiver is configured to implement communication between the UE policy obtaining apparatus and a first policy control function network element. The UE policy obtaining apparatus may further include a memory. The memory is configured to be coupled to the processor, and the memory stores a program instruction and data that are necessary for the UE policy obtaining apparatus.

According to another aspect, an embodiment of this application provides a UE policy obtaining apparatus. The UE policy obtaining apparatus has a function of implementing behavior of the access and mobility management function network element (for example, the AMF network element) in the foregoing methods. The functions may be implemented by hardware, or may be implemented by hardware by executing corresponding software. The hardware or software includes one or more modules corresponding to the foregoing functions. In a possible design, a structure of the UE policy obtaining apparatus includes a processor and a transceiver. The processor is configured to perform a corresponding function of the UE policy obtaining apparatus in the foregoing methods. The transceiver is configured to implement communication between the UE policy obtaining apparatus and a policy control function network element in a VPLMN. The UE policy obtaining apparatus may further include a memory. The memory is configured to be coupled to the processor, and the memory stores a program instruction and data that are necessary for the UE policy obtaining apparatus.

According to another aspect, an embodiment of this application provides a computer-readable storage medium. The computer-readable storage medium stores an instruction, and when the instruction is run on a computer, the computer is enabled to perform the methods in the foregoing aspects.

According to another aspect, an embodiment of this application provides a computer program product including an instruction. When the computer program product is run on a computer, the computer is enabled to perform the methods in the foregoing aspects.

According to another aspect, this application provides a chip system. The chip system includes a processor, configured to support the UE policy obtaining apparatus in implementing a function in the foregoing aspects, for example, generating or processing the information in the foregoing methods. In a possible design, the chip system further includes a memory. The memory is configured to store a program instruction and data that are necessary for the UE policy obtaining apparatus. The chip system may include a chip, or may include a chip and another discrete component.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following clearly describes the technical solutions in the embodiments of this application with reference to the accompanying drawings in the embodiments of this application. "A plurality of" in this application refers to two or more than two.

Figure 1:
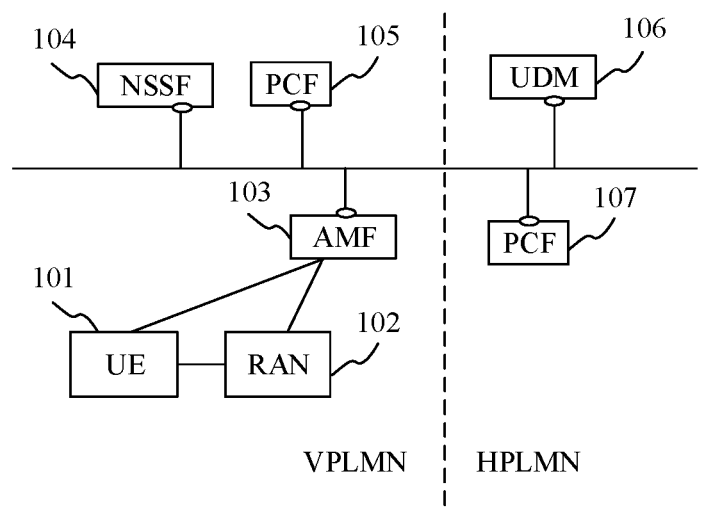
FIG. 1 is a schematic diagram of a 5G roaming communications system in a local break-out (local break-out, LBO) scenario according to an embodiment of this application.

FIG. 1 is a schematic diagram of a 5G roaming communications system in an LBO scenario according to an embodiment of this application. In a 5G mobile network architecture, a control plane function and a forwarding plane function of a mobile gateway are decoupled, and the separated control plane function of the mobile gateway and a conventional control network element such as a mobility management entity (MME) in the 3rd generation partnership project (3GPP) are combined to form a unified control plane. A user plane function (UPF) network element can implement user plane functions (SGW-U and PGW-U) of a serving gateway (SGW) and a packet data network gateway (PGW). Further, a unified control plane network element may be divided into an access and mobility management function (AMF) network element and a session management function (SMF) network element.

As shown in FIG. 1, the communications system includes at least user equipment (UE) 101, network devices in a VPLMN, and network devices in an HPLMN. The network devices in the VPLMN and the network devices in the HPLMN each include a policy control function (policy control function, PCF) network element 105 and a PCF network element 107.

The user equipment 101 in this system is not limited to a device in a 5G network, and includes a mobile phone, an internet of things device, a smart home device, an industrial control device, a vehicle device, and the like. The user equipment may alternatively be referred to as terminal equipment, a mobile station, a mobile console (Mobile), a remote station, a remote terminal, an access terminal, a user terminal, or a user agent. This is not limited herein. The user equipment may alternatively be a vehicle in vehicle-to-vehicle (V2V) communication, a machine in machine type communication, or the like.

A PCF network element (for example, the PCF network element 105 or the PCF network element 107) in this system includes a policy control function. Optionally, the PCF network element further supports a unified policy architecture to manage network behavior. Optionally, the PCF network element may further access subscription information related to a policy in a unified data repository. The PCF network element may also be referred to as a PCF entity or a PCF device.

Optionally, the network devices in the VPLMN further include a radio access network (RAN) device 102 and an AMF network element 103. The AMF network element 103 may be responsible for attachment, mobility management, a tracking area update procedure, and the like of a terminal device. The AMF network element may also be referred to as an AMF device or an AMF entity.

The RAN device 102 is an apparatus configured to provide a wireless communication function for the UE 101. The RAN device may include base stations in various forms, for example, a macro base station, a micro base station (also referred to as a small cell), a relay station, and an access point. In systems that use different radio access technologies, names of a device that has a base station function may be different. For example, in an LTE system, the device is referred to as an evolved NodeB (eNB or eNodeB); in a 3rd generation (3G) system, the device is referred to as a NodeB; in a new generation system, the device is referred to as a gNB (gNodeB).

In addition, the network devices in the VPLMN further include a network slice selection function (NSSF) network element 104 in the VPLMN. The NSSF network element 104 can select a network slice for user equipment. The NSSF network element may also be referred to as an NSSF device or an NSSF entity.

Optionally, the network devices in the HPLMN further include a unified data management (Unified Data Management, UDM) network element 106. The UDM network element 106 can store subscription data of a user. For example, the subscription data of the user includes subscription data related to mobility management and subscription data related to session management. The UDM network element may also be referred to as a UDM device or a UDM entity.

In the 5G roaming communications system in the LBO scenario shown in FIG. 1, the UE 101 registers with the VPLMN, to access a service of the VPLMN. In a registration process, the UE 101 selects an initial AMF device 103 by using the RAN device 102, and the initial AMF device 103 requests to obtain subscription data of the UE 101 from the UDM network element 106 in the HPLMN. If the initial AMF device 103 cannot provide a service for the UE 101, the initial AMF device 103 requests the NSSF network element 104 to select another AMF device that can meet a user requirement to provide a service for the user. The PCF network element 105 in the VPLMN may request to obtain a URSP of the HPLMN from the PCF network element 107 in the HPLMN, and then generate a URSP of the VPLMN and send the URSP to the UE 101. When initiating a service of an APP in the VPLMN, the UE 101 establishes a session based on the URSP of the VPLMN.

The foregoing network elements may be network elements implemented on dedicated hardware, or may be software instances run on dedicated hardware, or may be instances of virtualization functions on a proper platform. For example, the foregoing virtualization platform may be a cloud platform.

In addition, this embodiment of this application may also be applicable to another future-oriented communications technology. Network architectures and service scenarios described in this application are intended to describe the technical solutions in this application more clearly, but are not intended to limit the technical solutions provided in this application. A person of ordinary skill in the art may know that as the network architectures evolve and a new service scenario emerges, the technical solutions provided in this application are also applicable to a similar technical problem.

The following uses the 5G roaming communications system in the LBO scenario shown in FIG. 1 as an example to describe in detail the technical solutions of this application by using some embodiments. The following several embodiments may be combined with each other, and a same or similar concept or process may not be described repeatedly in some embodiments.

Figure 2:
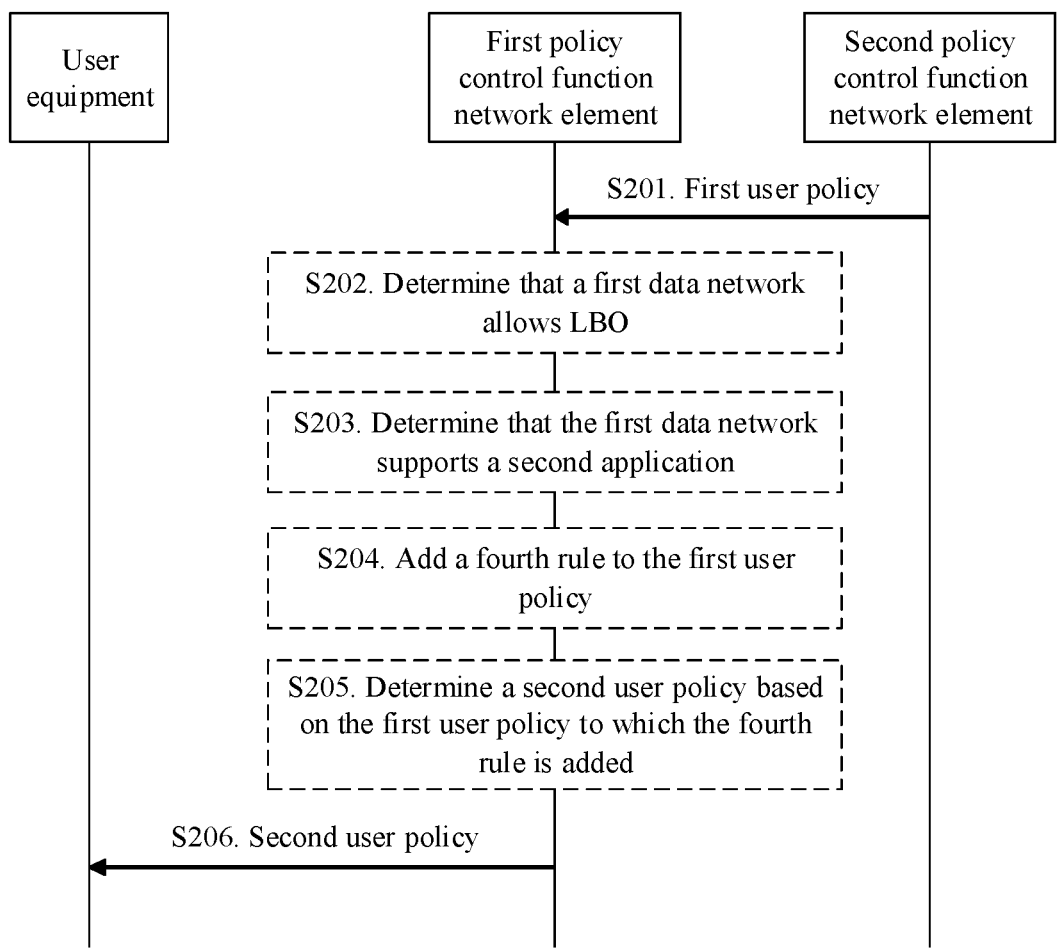
FIG. 2 is a flowchart of a UE policy obtaining method according to an embodiment of this application.

FIG. 2 is a flowchart of a UE policy obtaining method according to an embodiment of this application. The method may be used in a scenario in which user equipment obtains a UE policy of a VPLMN from a policy control function network element in the VPLMN. As shown in FIG. 2, the method may include the following steps.

S201. A second policy control function network element in an HPLMN sends a first UE policy of the HPLMN to a first policy control function network element of the VPLMN. Correspondingly, the first policy control function network element in the VPLMN receives the first UE policy of the HPLMN from the second policy control function network element in the HPLMN. The first UE policy includes a first rule. The first rule is used to indicate an association between first network slice identification information, a first application, and first data network identification information, and the first data network identification information is used to identify a first data network. The first data network allows LBO and supports the first application and a second application.

For example, the first policy control function network element is the PCF network element 105 in the VPLMN in FIG. 1, and the second policy control function network element is the PCF network element 107 in the HPLMN in FIG. 1. The first UE policy may be a first URSP. The first network slice identification information may be first S-NSSAI. The first data network may be a first DN. The first data network identification information used to identify the first data network may be a first data network name (DNN).

For example, the first URSP is shown in Table 1. In an example of Table 1, a DNN corresponding to a network slice identified as S-NSSAI 1 is a DNN 1. The DNN 1 is an identifier of a DN 1, and the DN 1 supports an APP 1. The first rule included in the first URSP is used to indicate an association between the S-NSSAI 1, the APP 1, and the DNN 1. When starting the APP 1, the user equipment determines, based on the first URSP, that S-NSSAI corresponding to the APP 1 is the S-NSSAI 1, and then initiates a session establishment procedure based on the identifier, the S-NSSAI 1, to establish a communication connection between the user equipment and the DN 1. In addition, the DN 1 allows LBO, and the DN 1 further supports an APP 2.

TABLE 1

| APP   | S-NSSAI   | DNN   |
|-------|-----------|-------|
| APP 1 | S-NSSAI 1 | DNN 1 |

For example, when the second PCF network element receives a request message that is sent by the first PCF network element and that is for obtaining the first URSP, or when the first PCF network element invokes a service for obtaining the first URSP, the second PCF network element sends the first URSP to the first PCF network element. A process in which the first PCF network element obtains the first URSP from the second PCF network element may be further described with reference to FIG. 5A and FIG. 5B or FIG. 6A and FIG. 6B.

S206. The first policy control function network element sends a second UE policy to the user equipment. Correspondingly, the user equipment receives the second UE policy from the first policy control function network element. The second UE policy includes a second rule and a third rule, the second rule is used to indicate an association between second network slice identification information, the first application, and the first data network identification information, and the third rule is used to indicate an association between the second network slice identification information, the second application, and the first data network identification information.

For example, the user equipment is the UE 101 in FIG. 1. The second UE policy may be a second URSP. The second network slice identification information may be second S-NSSAI.

It should be noted that the first policy control function network element may first send the second UE policy to an access and mobility management network element (for example, the AMF network element 103 in FIG. 1), and the access and mobility management network element forwards the second UE policy to the user equipment.

According to the method in this embodiment of the present invention, the second URSP of the VPLMN that is obtained by the user equipment includes information about an APP that does not exist in the first URSP of the HPLMN but can be used in an LBO scenario of the VPLMN, for example, a third rule associated with the second application. The user equipment can use more APP services in the LBO scenario of the VPLMN based on the second URSP obtained in this solution, thereby improving user experience.

For example, the network slice whose network slice type is the S-NSSAI 1 is deployed in the HPLMN, and the first URSP of the HPLMN includes a correspondence between the APP 1, the S-NSSAI 1, and the DNN 1. Therefore, in the HPLMN, the user equipment may establish a session connection between the user equipment and an APP 1 server. In the prior art, the second URSP of the VPLMN is obtained by the user equipment based on the first URSP of the HPLMN. Therefore, the second URSP of the VPLMN includes a correspondence associated with the APP 1 and the DNN 1. Therefore, in the VPLMN, the user equipment can still establish a session connection only to the APP 1 server, that is, can use only the APP 1. However, in the VPLMN, the DN 1 allows LBO, and the DN 1 further includes an APP 2 server. Therefore, in the VPLMN, the APP 2 server may essentially provide a service of the APP 2 for the user equipment. However, in the prior art, because there is no association corresponding to the APP 2 in the second URSP of the VPLMN, the user equipment cannot use the APP 2. Consequently, service experience of the user deteriorates. However, according to this embodiment of this application, the second URSP of the VPLMN includes the association corresponding to the APP 2. Therefore, the user equipment can use the APP 2, thereby improving user experience.

The following describes in detail an aspect in which the second S-NSSAI in the second URSP of the VPLMN is the same as the first S-NSSAI in the first URSP of the HPLMN and an aspect in which the second S-NSSAI corresponds to the first S-NSSAI.

For example, when the second S-NSSAI is the same as the first S-NSSAI, the second rule in the second URSP is the same as the first rule in the first URSP. The DN identified by the DNN 1 allows LBO, and in addition to the APP 1, the DN 1 further supports the APP 2. Therefore, the second URSP further includes an association between the S-NSSAI 1, the APP 2, and the DNN 1, as shown in Table 2. The association between the S-NSSAI 1, the APP 2, and the DNN 1 is the third rule in the second URSP.

TABLE 2

| APP   | S-NSSAI  | DNN   |
|-------|----------|-------|
| APP 1 | S-NSSAI 1 | DNN 1 |
| APP 2 | S-NSSAI 1 | DNN 1 |

When the second S-NSSAI corresponds to the first S-NSSAI, the second rule in the second URSP corresponds to the first rule in the first URSP. For example, the first S-NSSAI is the S-NSSAI 1, and the second S-NSSAI corresponding to the S-NSSAI 1 is eMBB. Therefore, the second URSP includes an association (that is, the foregoing second rule) between the APP 1, the eMBB, and the DNN 1. The DN identified by the DNN 1 allows LBO, and in addition to the APP 1, the DN 1 further supports the APP 2. Therefore, the second URSP further includes an association (that is, the third rule) between the APP 2, the eMBB, and the DNN 1, as shown in Table 3. The determining of the second URSP may be further described with reference to FIG. 3.

TABLE 3

| APP   | S-NSSAI | DNN   |
|-------|---------|-------|
| APP 1 | eMBB    | DNN 1 |
| APP 2 | eMBB    | DNN 1 |

For example, before S206, the first policy control function network element may determine the second URSP by using S202 to S205. S202 and S203 are optional steps. In other words, the first policy control function network element may alternatively determine the first DN and the second application in another manner. This is not limited in this embodiment.

S202. The first policy control function network element determines that the first data network allows LBO.

For example, after receiving the first URSP from the second policy control function network element, the first policy control function network element determines, based on a correspondence between a DNN and LBO in the first policy control function network element, a DN that is in the first URSP and that allows LBO, for example, the first DN. For example, the correspondence between a DNN and LBO may be preconfigured by a network management system in the first policy control function network element.

In a possible implementation, the correspondence between a DNN and LBO may be represented in a form of a DNN that allows LBO. For example:

DNNs that allow LBO: the DNN 1, a DNN 3, . . .

The foregoing example indicates that both the DN 1 identified by the DNN 1 and a DN 3 identified by the DNN 3 allow LBO.

In another possible implementation, the correspondence between a DNN and LBO may also be represented in a form of a table, as shown in Table 4. In an example of Table 4, the correspondence between a DNN and LBO includes: the DN 1 identified by the DNN 1 allows LBO, and a DN 2 identified by a DNN 2 prohibits LBO.

TABLE 4

| DNN   | Allow/Prohibit LBO |
|-------|--------------------|
| DNN 1 | Allow              |
| DNN 2 | Prohibit           |

Optionally, the first policy control function network element may further determine that a second DN is not a DN that allows LBO.

For example, the first URSP further includes the second DN that prohibits LBO. For example, the first URSP further includes a fifth rule used to indicate an association between third S-NSSAI, a third application, and a second DNN. The second DNN is used to identify the second DN, and the second DN supports the third application. For example, if the third S-NSSAI is S-NSSAI 2, the third application is an APP 3, and the second DNN is a DNN 2, the first URSP including the fifth rule may be shown in Table 5. The fifth rule included in the first URSP is used to indicate an association between the S-NSSAI 2, the APP 3, and the DNN 2.

TABLE 5

| APP   | S-NSSAI   | DNN   |
|-------|-----------|-------|
| APP 1 | S-NSSAI 1 | DNN 1 |
| APP 3 | S-NSSAI 2 | DNN 2 |

It should be noted that a difference between the first rule and the fifth rule lies in that, in the first rule, the DN 1 identified by the DNN 1 is a DN that allows LBO, but in the fifth rule, the DN 2 identified by the DNN 2 is not a DN that allows LBO, or in other words, the DN 2 is a DN that prohibits LBO.

S203. The first policy control function network element determines that the first data network supports the second application.

For example, after determining, by using S202, the first DN that allows LBO, the first policy control function network element determines, based on a correspondence between a DNN and an APP in the first policy control function network element, APPs supported by the first DN, for example, the first application and the second application. Further, the first policy control function network element determines, from the APPs supported by the first DN, an APP that is not in the first URSP, for example, the second application. For example, the correspondence between a DNN and an APP may be preconfigured by the network management system in the first policy control function network element. For example, the correspondence is shown in Table 6. In an example of Table 6, the DN 1 corresponding to the DNN 1 supports the APP 1 and the APP 2. It can be learned from Table 1 that the first URSP includes the association between the S-NSSAI 1, the APP 1, and the DNN 1, but the first URSP does not include the APP 2. Therefore, the first policy control function network element can determine that the second application further supported by the first DN is the APP 2. In other words, the user equipment cannot use the APP 2 in the HPLMN, but the user equipment can use the APP 2 in the LBO scenario of the VPLMN.

TABLE 6

| DNN | APP |
|---|---|
| DNN 1 | APP 1 and APP 2 |

Optionally, when the first URSP further includes the fifth rule, because the DN 2 identified by the DNN 2 in the fifth rule is not a DN that allows LBO, S203 and subsequent S204 and S205 do not need to be performed.

S204. The first policy control function network element adds a fourth rule to first UE policy, where the fourth rule includes an association between the first network slice identification information, the second application, and the first data network identification information.

For example, in the first rule, the first S-NSSAI associated with the first DNN (DNN 1) is the S-NSSAI 1. In addition, the second application that is further supported by the DN identified by the DNN and that is determined in S203 is the APP 2. Therefore, the fourth rule includes an association between the S-NSSAI 1, the APP 2, and the first DNN. With reference to the first URSP shown in Table 1, the first URSP to which the fourth rule is added may be shown in Table 2.

Optionally, when the first URSP further includes the fifth rule, after the fourth rule is added, the first URSP may be shown in Table 7, and details are not described herein again.

TABLE 7

| APP | S-NSSAI | DNN |
|---|---|---|
| APP 1 | S-NSSAI 1 | DNN 1 |
| APP 2 | S-NSSAI 1 | DNN 1 |
| APP 3 | S-NSSAI 2 | DNN 2 |

S205. The first policy control function network element determines the second UE policy based on the first UE policy to which the fourth rule is added.

Optionally, when the second S-NSSAI corresponding to the DNN 1 in the VPLMN is the same as the first S-NSSAI in the HPLMN, the second URSP is the first URSP to which the fourth rule is added. For example, the second URSP may be shown in Table 2. The second URSP includes the second rule indicating the association between the second S-NSSAI, the first APP, and the first DNN, and the third rule indicating the association between the second S-NSSAI, the second APP, and the first DNN.

Optionally, when the first URSP includes the second DN that prohibits LBO, and third S-NSSAI corresponding to the DNN 2 in the VPLMN is the same as fourth S-NSSAI in the HPLMN, the second URSP may be shown in Table 7. The second URSP further includes a sixth rule indicating an association between the fourth S-NSSAI, the third APP, and the second DNN. That is, the fifth rule is the same as the sixth rule.

Therefore, the first policy control function network element determines the second URSP.

Optionally, when S-NSSAI corresponding to the DNN 1 in the VPLMN corresponds to the first S-NSSAI in the HPLMN, step 205 includes: obtaining, by the first policy control function network element, a mapping relationship between the S-NSSAI in the VPLMN and the S-NSSAI in the HPLMN, and determining the second UE policy based on the mapping relationship and the first UE policy to which the fourth rule is added. This may be further described in detail with reference to FIG. 3.

Therefore, in the foregoing solution, the second URSP determined by the first policy control function network element includes the information about the APP that can be used in the LBO scenario of the VPLMN. The user equipment may use, in the LBO scenario of the VPLMN, an APP service supported in the scenario based on the second URSP obtained in this solution.

Figure 3:
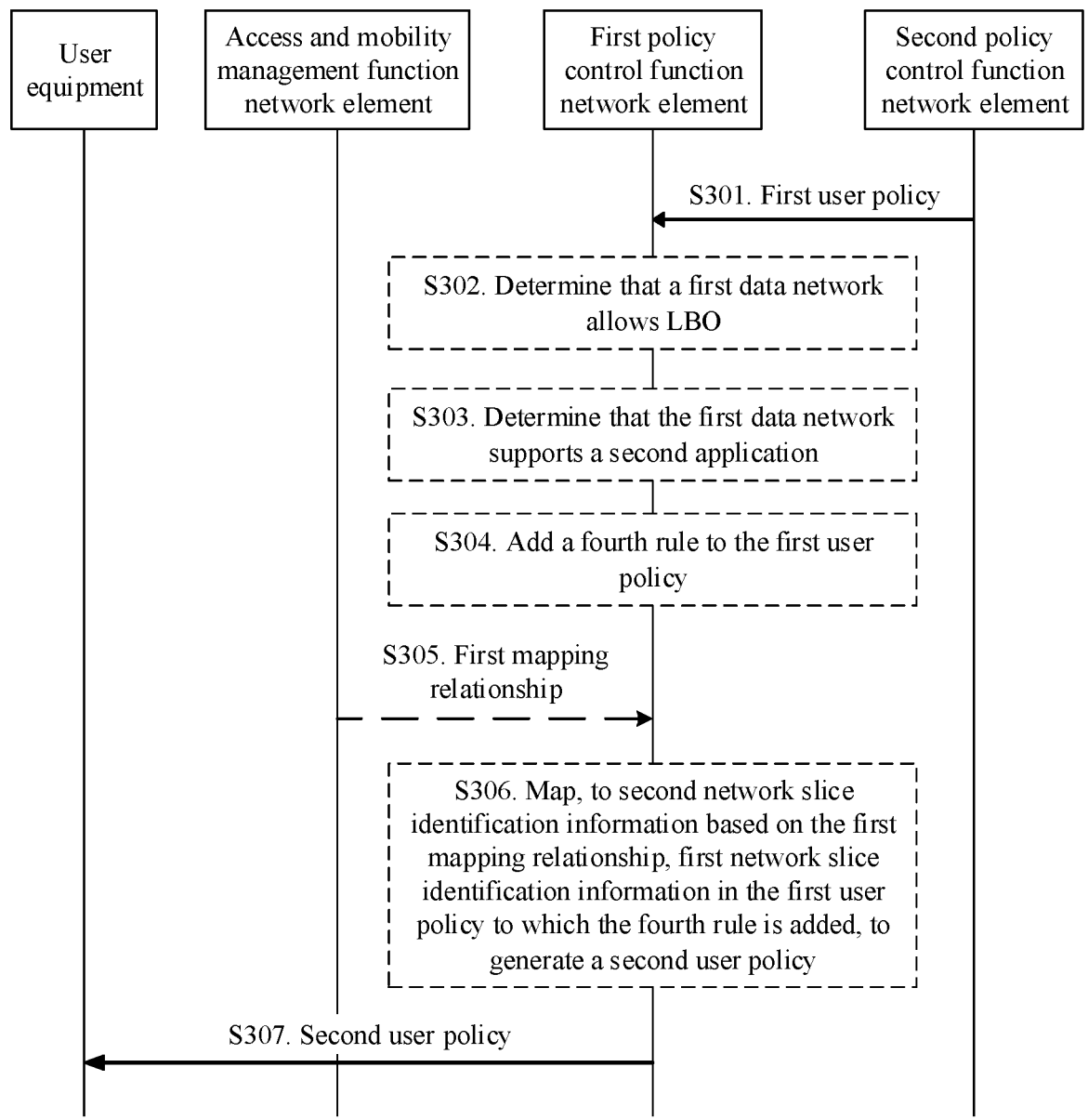
FIG. 3 is a flowchart of another UE policy obtaining method according to an embodiment of this application.

FIG. 3 is a flowchart of another UE policy obtaining method according to an embodiment of this application. The method may be used in a scenario in which user equipment obtains a UE policy of a VPLMN from a policy control function network element in the VPLMN when S-NSSAI in the VPLMN corresponds to S-NSSAI in an HPLMN. In this scenario, the policy control function network element in the VPLMN generates a second URSP through mapping. As shown in FIG. 3, the method may include the following steps.

For S301, refer to the description of S201 in FIG. 2. For S307, refer to the description of S206 in FIG. 2. Details are not described herein again.

For example, before S307, the first policy control function network element may further determine the second URSP by using S302 to S306. For S302 to S304, refer to descriptions of S202 to S204 in FIG. 2. Details are not described herein again.

Before S307, the first policy control function network element may perform S305 and S306 in the following.

S305. The first policy control function network element receives a first mapping relationship between the first network slice identification information and the second network slice identification information from an access and mobility management function network element in the VPLMN. The first mapping relationship may be used to generate the second UE policy.

For example, the access and mobility management function network element is the AMF network element 103 in FIG. 1. The first mapping relationship between the first S-NSSAI and the second S-NSSAI may be generated by a network slice selection function network element (for example, the NSSF network element 104 in FIG. 1) based on a roaming agreement between the VPLMN and the HPLMN, and provided to the AMF network element. Alternatively, the first mapping relationship between the first S-NSSAI and the second S-NSSAI may be generated by the AMF network element based on the roaming protocol. For example, the roaming agreement may be a service level agreement (SLA).

Different types of network slices may be deployed by different operators, and different network slice types may be identified by using standard S-NSSAI, or may be identified by using specific S-NSSAI. The standard S-NSSAI is S-NSSAI that can be identified by all operators. For example, the current third generation partnership project (3GPP) standard has specified three network slice types: enhanced mobile broadband (eMBB), ultra-reliable low latency communications (URLLC), and massive internet of things (massive IoT, MIoT). However, a network slice identified by the specific S-NSSAI may not be identified by all operators, and only an operator that deploys the network slice identified by the S-NSSAI can identify the specific S-NSSAI. For example, a network slice type other than the three network slice types specified in the 3GPP standard may be considered as a specific type, for example, vehicle-to-everything (V2X).

Four mapping manners may be implemented by using a mapping relationship between S-NSSAI: mapping from standard S-NSSAI to another standard S-NSSAI, or mapping from specific S-NSSAI to standard S-NSSAI, or mapping from standard S-NSSAI to specific S-NSSAI, or mapping from specific S-NSSAI to another specific S-NSSAI.

S306. The first policy control function network element maps, to the second network slice identification information based on the first mapping relationship, the first network slice identification information in the first UE policy to which the fourth rule is added, to generate the second UE policy.

The following separately describes in detail S305 and S306 in the foregoing four mapping scenarios.

Manner 1:

Both the first S-NSSAI and the second S-NSSAI are standard S-NSSAI. For example, to implement load balancing, the NSSF network element generates a mapping relationship from the first S-NSSAI to the second S-NSSAI.

For example, the first mapping relationship may be shown in Table 8. In Table 8, the first S-NSSAI is eMBB in the HPLMN, the second S-NSSAI is MIoT in the VPLMN, and the first mapping relationship is that the eMBB corresponds to the MIoT.

TABLE 8

| First S-NSSAI | Second S-NSSAI |
|---|---|
| eMBB | MIoT |

In the first mapping relationship, a network slice type corresponding to an APP in the first URSP is the first S-NSSAI. Because a network slice corresponding to the first S-NSSAI in the VPLMN is overloaded, to implement load balancing, the NSSF network element maps the first S-NSSAI to the second S-NSSAI, so that the user equipment establishes a session by using a network slice corresponding to the second S-NSSAI. For example, in a scenario corresponding to Table 8, the user equipment carries S-NSSAI that identifies an eMBB slice type to request to establish a session. However, a network slice of the eMBB type in the VPLMN is overloaded. Therefore, the NSSF network element maps an eMBB identifier to a MIoT identifier, so that the user equipment establishes a session by using a network slice of the MIoT type when starting an APP. In this case, the first mapping relationship is that the S-NSSAI of the eMBB slice type corresponds to S-NSSAI of the MIoT slice type.

In the first mapping manner, a specific manner in which the first policy control function network element performs S306 to generate the second URSP is as follows:

For example, the first URSP to which the fourth rule is added is shown in Table 9. In an example of Table 9, a DNN corresponding to a network slice identified as eMBB is a DNN 1, the DNN 1 is an identifier of a DN 1, and the DN 1 supports an APP 1 and an APP 2. The first rule is used to indicate an association between the eMBB, the APP 1, and the DNN 1, and the fourth rule is used to indicate an association between the eMBB, the APP 2, and the DNN 1.

TABLE 9

| APP | S-NSSAI | DNN |
|---|---|---|
| APP 1 | eMBB | DNN 1 |
| APP 2 | eMBB | DNN 1 |

It can be learned based on the mapping relationship in Table 8 that the eMBB in the HPLMN corresponds to the MIoT in the VPLMN. Therefore, the first S-NSSAI (for example, the eMBB) may be mapped to the second S-NSSAI (for example, the MIoT), to generate the second URSP. The generated second URSP may be shown in Table 10. In an example of Table 10, the second URSP includes the second rule and the third rule. The second rule is used to indicate an association between the second S-NSSAI (for example, the MIoT), the first application (for example, the APP 1), and the first DNN (for example, the DNN 1). The third rule is used to indicate an association between the second S-NSSAI (for example, MIoT), the second application (for example, the APP 2), and the first DNN (for example, the DNN 1).

TABLE 10

| APP | S-NSSAI | DNN |
|---|---|---|
| APP 1 | MIoT | DNN 1 |
| APP 2 | MIoT | DNN 1 |

Manner 2:

When the first S-NSSAI is HPLMN-specific S-NSSAI, and the second S-NSSAI is standard S-NSSAI, the NSSF network element generates the first mapping relationship between the first S-NSSAI and the standard S-NSSAI based on the roaming agreement between the VPLMN and the HPLMN.

For example, the first mapping relationship may be shown in Table 11. In Table 11, the first S-NSSAI is S-NSSAI 1 in the HPLMN, the second S-NSSAI is URLLC in the VPLMN, and the first mapping relationship is that the S-NSSAI 1 corresponds to the URLLC.

TABLE 11

| First S-NSSAI | Second S-NSSAI |
|---|---|
| S-NSSAI 1 | URLLC |

In the second mapping manner, a specific manner in which the first policy control function network element performs S306 to generate the second URSP is as follows:

For example, the first URSP to which the fourth rule is added is shown in Table 2. In an example of Table 2, a DNN corresponding to a network slice identified as the S-NSSAI 1 is a DNN 1. The DNN 1 is an identifier of a DN 1, and the DN 1 supports an APP 1 and an APP 2.

It can be learned based on the mapping relationship in Table 11 that the S-NSSAI 1 in the HPLMN corresponds to the URLLC in the VPLMN. Therefore, the first S-NSSAI (for example, the S-NSSAI 1) may be mapped to the second S-NSSAI (for example, the URLLC), to generate the second URSP. The generated second URSP may be shown in Table 12. In an example of Table 12, the second URSP includes the second rule and the third rule. The second rule is used to indicate an association between the second S-NSSAI (for example, the URLLC), the first application (for example, the APP 1), and the first DNN (for example, the DNN 1). The third rule is used to indicate an association between the second S-NSSAI (for example, the URLLC), the second application (for example, the APP 2), and the first DNN (for example, the DNN 1).

TABLE 12

| APP | S-NSSAI | DNN |
| --- | --- | --- |
| APP 1 | URLLC | DNN 1 |
| APP 2 | URLLC | DNN 1 |

Manner 3:

When a network slice corresponding to the first S-NSSAI deployed in the HPLMN is a network slice identified by standard S-NSSAI, but the network slice identified by the standard S-NSSAI is not deployed in the VPLMN, the NSSF network element generates the first mapping relationship between the first S-NSSAI and the VPLMN-specific S-NS-SAI based on the roaming protocol between the VPLMN and the HPLMN. The second S-NSSAI is VPLMN-specific S-NSSAI.

For example, the first mapping relationship may be shown in Table 13. In Table 13, the first S-NSSAI is eMBB (standard S-NSSAI) in the HPLMN, the second S-NSSAI is S-NSSAI A in the VPLMN, and the first mapping relationship is that the eMBB corresponds to the S-NSSAI A.

TABLE 13

| First S-NSSAI | Second S-NSSAI |
| --- | --- |
| eMBB | S-NSSAI A |

In the third mapping manner, a specific manner in which the first policy control function network element performs S306 to generate the second URSP is as follows:

For example, when the first S-NSSAI is standard S-NSSAI, assuming that the first S-NSSAI is eMBB, the first URSP to which the fourth rule is added is shown in Table 9. In an example of Table 9, a DNN corresponding to a network slice identified as the eMBB is a DNN 1. The DNN 1 is an identifier of a DN 1, and the DN 1 supports an APP 1 and an APP 2. The first rule is used to indicate an association between the eMBB, the APP 1, and the DNN 1, and the fourth rule is used to indicate an association between the eMBB, the APP 2, and the DNN 1.

It can be learned based on the mapping relationship in Table 13 that the eMBB in the HPLMN corresponds to the S-NSSAI A in the VPLMN. Therefore, the first S-NSSAI (for example, the eMBB) may be mapped to the second S-NSSAI (for example, the S-NSSAI A), to generate the second URSP. The generated second URSP may be shown in Table 14. In an example of Table 14, the second URSP includes the second rule and the third rule. The second rule is used to indicate an association between the second S-NSSAI (for example, the S-NSSAI A), the first application (for example, the APP 1), and the first DNN (for example, the DNN 1). The third rule is used to indicate an association between the second S-NSSAI (for example, the S-NSSAI A), the second application (for example, the APP 2), and the first DNN (for example, the DNN 1).

TABLE 14

| APP | S-NSSAI | DNN |
| --- | --- | --- |
| APP 1 | S-NSSAI A | DNN 1 |
| APP 2 | S-NSSAI A | DNN 1 |

Manner 4:

When the first S-NSSAI is HPLMN-specific S-NSSAI, but a network slice identified by the HPLMN-specific S-NSSAI is not deployed in the VPLMN, the NSSF network element generates the first mapping relationship between the first S-NSSAI and VPLMN-specific S-NSSAI based on the roaming protocol between the VPLMN and the HPLMN. The second S-NSSAI is the VPLMN-specific S-NSSAI.

For example, the first mapping relationship may be shown in Table 15. In Table 15, the first S-NSSAI is S-NSSAI 1 (the HPLMN-specific S-NSSAI) in the HPLMN, the second S-NSSAI is S-NSSAI A in the VPLMN, and the first mapping relationship is that the S-NSSAI 1 corresponds to the S-NSSAI A.

TABLE 15

| First S-NSSAI | Second S-NSSAI |
| --- | --- |
| S-NSSAI 1 | S-NSSAI A |

In the fourth mapping manner, a specific manner in which the first policy control function network element performs S306 to generate the second URSP is as follows:

For example, when the first S-NSSAI is the HPLMN-specific S-NSSAI, assuming that the first S-NSSAI is the S-NSSAI 1 in the HPLMN, the first URSP to which the fourth rule is added is shown in Table 2. In an example of Table 2, a DNN corresponding to a network slice identified as the S-NSSAI 1 is a DNN 1. The DNN 1 is an identifier of a DN 1, and the DN 1 supports an APP 1 and an APP 2.

It can be learned based on the mapping relationship in Table 15 that the S-NSSAI 1 in the HPLMN corresponds to the S-NSSAI A in the VPLMN. Therefore, the first S-NSSAI (for example, the S-NSSAI 1) may be mapped to the second S-NSSAI (for example, the S-NSSAI A), to generate the second URSP. The generated second URSP may be shown in Table 14. Therefore, in any one of the foregoing four mapping manners, according to the foregoing solution, the first policy control function network element can determine the second URSP based on the first mapping relationship and the first URSP to which the fourth rule is added. The second URSP includes an APP that does not exist in the first URSP of the HPLMN but can be used in an LBO scenario of the VPLMN. Therefore, the user equipment can use more APPs in the LBO scenario of the VPLMN based on the second URSP obtained in this solution, thereby improving user experience.

Optionally, when the first URSP further includes a second DN that prohibits LBO, the first policy control function network element may further receive a second mapping relationship between third S-NSSAI and fourth S-NSSAI from the access and mobility management function network element in the VPLMN. For mapping from the third S-NSSAI to the fourth S-NSSAI, refer to mapping from the first S-NSSAI to the second S-NSSAI. Details are not described herein again.

Figure 4:
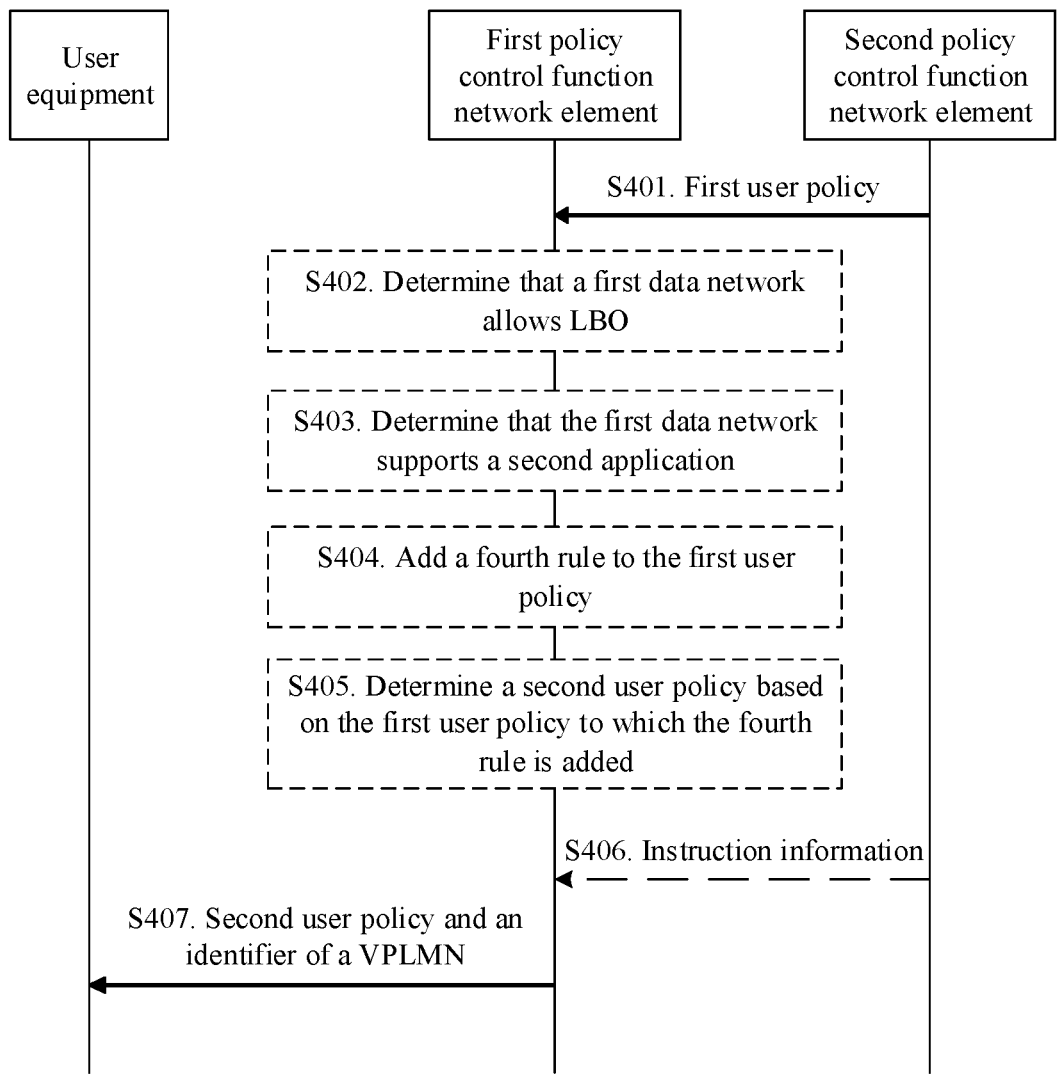
FIG. 4 is a flowchart of another UE policy obtaining method according to an embodiment of this application.

FIG. 4 is a flowchart of another UE policy obtaining method according to an embodiment of this application. FIG. 4 is described with reference to FIG. 2 and FIG. 3.

For S401 to S404, refer to descriptions of S201 to S204 in FIG. 2 or S301 to S304 in FIG. 3. Details are not described herein again.

For S405, refer to the description of S205 in FIG. 2. For example, the second URSP is the first URSP to which the fourth rule is added. Alternatively, for S405, refer to descriptions of S305 and S306 in FIG. 3. Details are not described herein again.

In an example of FIG. 4, the method may further include the following steps.

S407. The first policy control function network element sends the second URSP and an identifier of the VPLMN to the user equipment. Correspondingly, the user equipment receives the second URSP and the identifier of the VPLMN from the first policy control function network element. The identifier of the VPLMN is associated with the second URSP.

Therefore, when moving from another area to the VPLMN, the user equipment can learn of the second URSP based on the identifier of the VPLMN, so that the user equipment is prevented from requesting to obtain the second URSP again, and interaction between the user equipment and the network can be reduced, thereby reducing a latency and improving efficiency.

Optionally, the first policy control function network element further sends the first URSP and an identifier of the HPLMN to the user equipment. Correspondingly, the user equipment receives the first URSP and the identifier of the HPLMN from the first policy control function network element. The identifier of the HPLMN is associated with the first URSP.

According to the foregoing solution, the user equipment may obtain the first URSP and the identifier of the HPLMN. Therefore, when moving from another area to the HPLMN and starting an APP, the user equipment can learn of the first URSP based on the identifier of the HPLMN, so that the user equipment is prevented from requesting to obtain the first URSP, and interaction between the user equipment and the network can be reduced, thereby reducing a latency and improving efficiency.

It should be noted that the first URSP and the identifier of the HPLMN, and the second URSP and the identifier of the VPLMN may be sent to the user equipment by using a same message, or may be sent to the user equipment by using different messages. This is not limited in this application.

Optionally, before S407, the first policy control function network element may perform S406. It should be noted that a sequence of S406 and S401 is not limited in this application. To be specific, S401 may be performed before S406, or S406 may be performed before S401, or S401 and S304 are performed simultaneously.

S406. The second policy control function network element sends instruction information to the first policy control function network element. Correspondingly, the first policy control function network element receives the instruction information from the second policy control function network element. The instruction information is used to trigger sending of the first URSP and the identifier of the HPLMN to the user equipment. For example, the instruction information may be a flag. This is not limited in this embodiment.

For example, when the first policy control function network element requests to obtain the first URSP from the second policy control function network element, if the second policy control function network element determines that the second policy control function network element does not have context information of the user equipment, it indicates that the user equipment has not registered with the HPLMN. Therefore, the user equipment has not obtained the first URSP from the second policy control function network element. In this scenario, the second policy control function network element may trigger, by sending the instruction information to the first policy control function network element, the first policy control function network element to send the first URSP and the identifier of the HPLMN to the user equipment.

Therefore, the first policy control function network element can learn of the scenario in which the user equipment does not have the first UE policy. In this scenario, the instruction information triggers the first policy control function network element to send the first UE policy and the identifier of the HPLMN to the user equipment. In this way, the user equipment is prevented from repeatedly obtaining the first UE policy, and interaction between the user equipment and the network can be reduced, thereby reducing a latency.

Figure 5A:
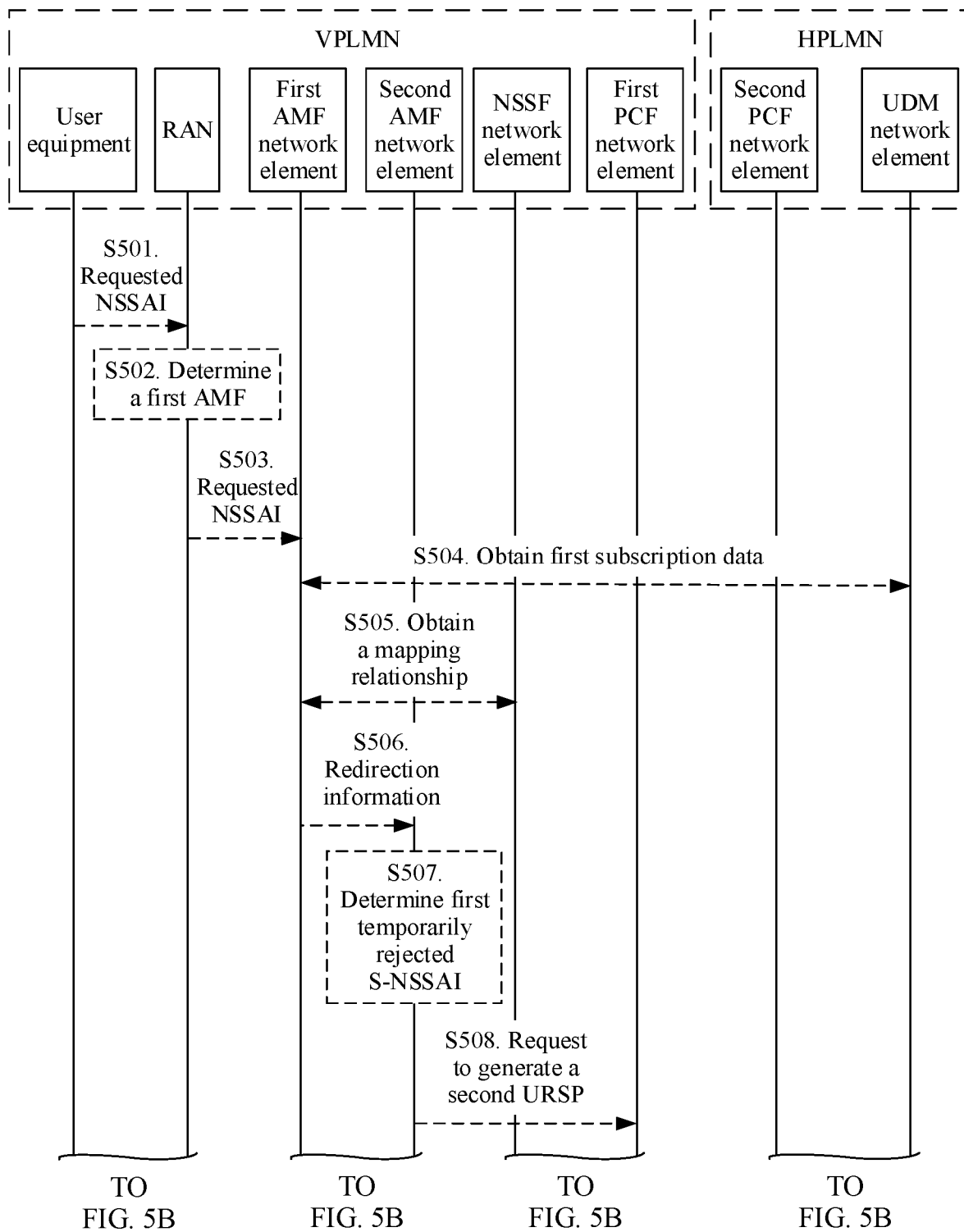
FIG. 5A and FIG. 5B are a signaling interaction diagram of another UE policy obtaining method according to an embodiment of this application.
Figure 5B:
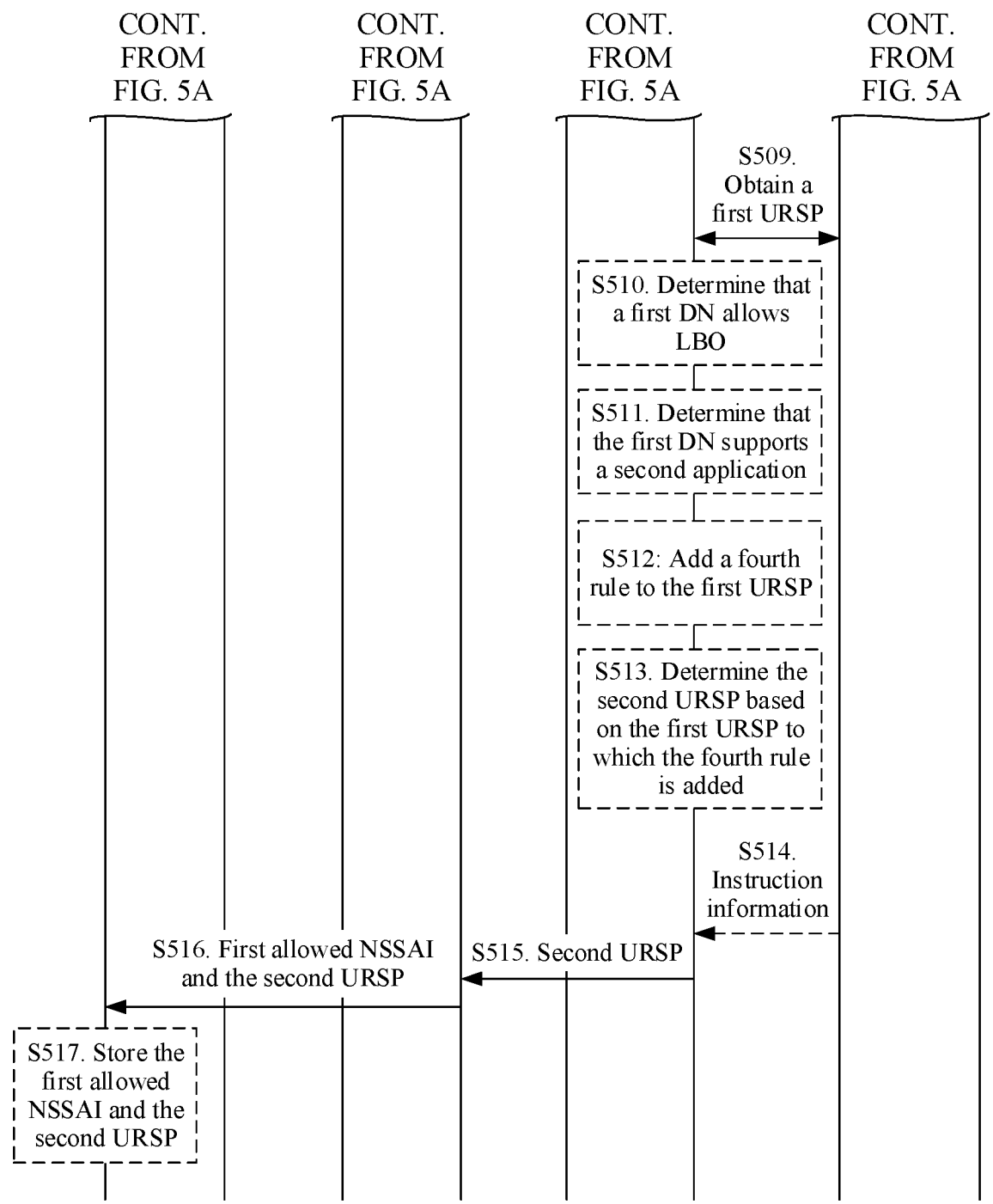

FIG. 5A and FIG. 5B are a signaling interaction diagram of another URSP obtaining method according to an embodiment of this application. The method may be used in a scenario in which user equipment obtains a URSP of a VPLMN from a policy control function network element in the VPLMN when the user equipment registers with the VPLMN. For example, in FIG. 5A and FIG. 5B, the user equipment is the UE 101 in FIG. 1, a RAN device is the RAN device 102 in FIG. 1, a first AMF network element and a second AMF network element are the AMF network element 103 in FIG. 1, an NSSF network element is the NSSF network element 104 in FIG. 1, a first PCF network element is the PCF network element 105 in the VPLMN in FIG. 1, a second PCF network element is the PCF network element 107 in the HPLMN in FIG. 1, and a UDM network element is the UDM network element 106 in FIG. 1. FIG. 5A and FIG. 5B are described with reference to FIG. 2 to FIG. 4. As shown in FIG. 5A and FIG. 5B, the method may include the following steps.

S501. The user equipment sends requested network slice selection assistance information (NSSAI) to the RAN device, and correspondingly, the RAN device receives the requested NSSAI from the user equipment. The NSSAI is a set of S-NSSAI. In other words, the NSSAI includes one or more pieces of S-NSSAI. The user equipment selects a network slice based on the requested NSSAI during initial network access.

For example, when the user equipment initiates initial registration after moving to the VPLMN, S501 may be performed.

The requested NSSAI may be NSSAI configured before the user equipment interacts with the VPLMN.

The user equipment may further send, to the RAN device, a subscriber permanent identifier (SUPI) of the user equipment and a type of a wireless access network that the user equipment requests to access.

S502. The RAN device determines the first AMF network element in the VPLMN based on the requested NSSAI. The determined first AMF network element is an initial AMF network element.

For example, the RAN device selects the first AMF network element based on the SUPI, the requested NSSAI, and the wireless access network type. If the RAN device cannot select an AMF network element that meets a requirement, the RAN device determines, based on local policy information, that a default AMF network element is the first AMF network element.

S503. The RAN device sends the requested NSSAI to the first AMF network element, and correspondingly, the first AMF network element receives the requested NS SAI from the RAN device.

For example, the RAN device may further send the SUPI to the first AMF network element.

S504. The first AMF network element obtains first subscription data from the UDM network element in an HPLMN.

For example, the first AMF network element may obtain the first subscription data from the UDM network element in the HPLMN by sending a request message or by invoking a service. For example, the first AMF network element sends a request message including the SUPI to the UDM network element. Alternatively, the first AMF network element requests to obtain the first subscription data by invoking a Nudm_SubscriberDataManagement_Get_service, and the UDM network element returns the first subscription data by invoking a Nudm_SubscriberDataManagement Get response service.

For example, the first subscription data includes an association between subscribed S-NSSAI and a DNN. Table 16 describes the association between subscribed S-NSSAI and a DNN. In an example of Table 16, the subscribed S-NSSAIs include S-NSSAI 1 and S-NSSAI 2, the S-NSSAI 1 corresponds to a DNN 1, and the S-NSSAI 2 corresponds to a DNN 2 and a DNN 3.

TABLE 16

| Subscribed S-NSSAIs | DNN |
| --- | --- |
| S-NSSAI 1 | DNN 1 |
| S-NSSAI 2 | DNN 2 and DNN 3 |

If the first AMF network element supports a network slice corresponding to the NSSAI requested by the user equipment, a method for obtaining the URSP by the user equipment may be further described with reference to FIG. 6A and FIG. 6B.

If the first AMF network element does not support the network slice corresponding to the NSSAI requested by the user equipment, the first AMF network element performs S505 after S504.

S505. The first AMF network element obtains a mapping relationship from the NSSF network element in the VPLMN.

For example, a request of the first AMF network element to obtain the mapping relationship from the NSSF network element in the VPLMN may be implemented by sending a request message or by invoking a service. For example, the first AMF network element requests to obtain the mapping relationship by invoking a slice selection request service, and the NSSF network element in the VPLMN returns the mapping relationship by invoking a slice selection response service. The mapping relationship includes a first mapping relationship. For example, for the first mapping relationship, refer to the description of S305 in FIG. 3. Details are not described herein again. In addition, the mapping relationship may further include a second mapping relationship.

For example, the first AMF network element sends the requested NSSAI, the subscribed NSSAI, and a PLMN identifier in the SUPI to the NSSF network element in the VPLMN, to request to obtain the mapping relationship from the NSSF network element. The NSSF network element learns, based on the PLMN identifier in the SUPI, that the user equipment is a roaming user, and determines a target AMF set and first allowed NSSAI. The target AMF set is one or more AMFs that meet a requirement of the user equipment, and S-NSSAI included in the first allowed NSSAI is S-NSSAI of a network slice that can be used by the user equipment in the VPLMN. If the HPLMN and the VPLMN use different S-NSSAI, the NSSF network element further generates the mapping relationship based on a roaming agreement between the VPLMN and the HPLMN. The mapping relationship is a mapping relationship between the S-NSSAI in the HPLMN and the S-NSSAI in the VPLMN.

For example, the first AMF network element is further configured to request, by invoking the slice selection request service, the NSSF network element to select an AMF network element that meets a requirement of the NS SAI requested by the user equipment.

S506. The first AMF network element sends redirection information to the second AMF network element, and correspondingly, the second MF network element receives the redirection information from the first AMF network element. The second AMF network element is an AMF network element selected by the first AMF network element from the target AMF set.

For example, the redirection information includes the first allowed NSSAI. Optionally, the redirection information further includes the mapping relationship obtained in S505.

Optionally, the redirection information further includes the requested NSSAI and the subscribed S-NSSAI.

S507. The second AMF network element determines first temporarily rejected S-NSSAI. The first temporarily rejected S-NSSAI is S-NSSAI that is included in the requested NSSAI and that belongs to the subscribed S-NSSAI, but that is of a network slice that is not deployed in a current registration area. In other words, the first temporarily rejected S-NSSAI is included in the subscribed S-NSSAI, but is not included in the first allowed NSSAI.

For example, a relationship between the requested NSSAI, the subscribed S-NSSAIs, the first allowed NSSAI, and the first temporarily rejected S-NSSAI may be shown in Table 17. In Table 17, the NSSAI requested by the user equipment includes S-NSSAI 1, S-NSSAI 2, S-NSSAI 3, and S-NSSAI 4, the S-NSSAIs subscribed by the user equipment include the S-NSSAI 1, the S-NSSAI 2, and the S-NSSAI 3, the first allowed S-NSSAIs include the S-NSSAI 1 and the S-NSSAI 2, and first temporarily rejected S-NSSAI includes the S-NSSAI 3. The S-NSSAI 4 is S-NSSAI that is not allowed to be subscribed. For example, the first temporarily rejected S-NSSAI is S-NSSAI other than the first allowed S-NSSAI in the subscribed S-NSSAI. The S-NSSAI that is not allowed to be subscribed is S-NSSAI other than the subscribed S-NSSAI in the requested NSSAI.

TABLE 17

| Requested NSSAI | S-NSSAI 1, S-NSSAI 2, S-NSSAI 3, and S-NSSAI 4 |
| --- | --- |
| Subscribed S-NSSAIs | S-NSSAI 1, S-NSSAI 2, and S-NSSAI 3 |
| First allowed NSSAIs | S-NSSAI 1 and S-NSSAI 2 |
| First temporarily rejected S-NSSAI | S-NSSAI 3 |

S508. The second AMF network element requests the first PCF network element to generate a second URSP. The first PCF network element is a PCF network element selected by the second AMF network element from the VPLMN. For example, the second AMF network element may further request, by invoking an Npcf_AMPolicyControl_Get_service, the first PCF network element to generate the second URSP of the VPLMN.

Optionally, in S508, the second AMF network element may alternatively send the mapping relationship to the first PCF network element. Correspondingly, the first PCF network element receives the mapping relationship from the second AMF network element.

Optionally, the second AMF network element sends the first allowed NSSAI, or the first allowed NS SAI and the first temporarily rejected S-NSSAI to the first PCF network element.

Optionally, the second AMF network element may alternatively send the first subscription data to the first PCF network element.

S509. The first PCF network element obtains the first URSP from the second PCF network element.

For example, a request of the first PCF network element to obtain the first URSP from the second PCF network element may be implemented by sending a request message or by invoking a service. For example, the first PCF network element obtains the first URSP by invoking an Npcf_AMPolicyControl_Get (SUPI) service request, and the second PCF network element returns the first URSP by invoking an Npcf_AMPolicyControl_Response service. The first URSP includes a first rule. The first rule is used to indicate an association between first S-NSSAI, a first application, and a first DNN, the first DNN is used to identify a first DN, and the first DN allows LBO and supports the first application and a second application.

Optionally, the second PCF network element sends the first subscription data to the first PCF network element. Correspondingly, the first PCF network element receives the first subscription data from the second PCF network element. It should be noted that the first PCF network element may send the first subscription data and the first URSP by using a same message, or may send the first subscription data and the first URSP by using different messages.

Therefore, the first PCF network element may obtain the subscription data from the second PCF network element by using the optional step of S509. Alternatively, the first PCF network element may obtain the subscription data from the second AMF by performing S508. It should be noted that the first PCF network element may obtain the subscription data in either of the foregoing two manners, or the first PCF network element may obtain the subscription data in another manner. This is not limited in this embodiment.

S510. The first PCF network element determines that the first DN allows LBO.

S511. The first PCF network element determines that the first DN supports the second application.

S512. The first PCF network element adds a fourth rule to the first URSP, where the fourth rule includes an association between the first S-NSSAI, the second application, and the first DNN.

S513. The first PCF network element determines the second URSP based on the first URSP to which the fourth rule is added.

S515. The first PCF network element sends the second URSP to the second AMF network element, and correspondingly, the second AMF network element receives the second URSP from the first PCF network element. The second URSP includes a second rule and a third rule. The second rule is used to indicate an association between second S-NSSAI, the first application, and the first DNN, and the third rule is used to indicate an association between the second S-NSSAI, the second application, and the first DNN. The second S-NSSAI is the same as or corresponds to the first S-NSSAI.

For example, the first PCF network element may send the second URSP to the second AMF network element by sending a message or by invoking a service. For example, the first PCF network element sends the second URSP by invoking an Npcf_AMPolicyControl_Response service.

Optionally, the first PCF network element may further send an identifier of the VPLMN to the second AMF network element, and the identifier of the VPLMN is associated with the second URSP.

Optionally, the first PCF network element may further send the first URSP and an identifier of the HPLMN to the second AMF network element, and the identifier of the HPLMN is associated with the first URSP.

Optionally, before S515, the first PCF network element may perform S514.

S514. The second PCF network element sends instruction information to the first PCF network element. Correspondingly, the first PCF network element receives the instruction information from the second PCF network element. The instruction information is used to trigger sending of the first URSP and the identifier of the HPLMN to the user equipment.

For S510 to S512, refer to the descriptions of S203 to S205 in FIG. 2. For S513, refer to the description of S205 in FIG. 2 or S306 in FIG. 3. For S514, refer to the description of S406 in FIG. 4. Therefore, S510 to S514 are not described herein again.

S515. The first PCF network element sends the second URSP to the second AMF network element.

S516. The second AMF network element sends the first allowed NSSAI and the second URSP to the user equipment. Correspondingly, the user equipment receives the first allowed NS SAI and the second URSP from the second AMF network element. For example, the first allowed NS SAI and the second URSP may be transmitted by using a registration accept (Registration Accept) message.

S517. The user equipment stores the first allowed NS SAI and the second URSP.

For example, after storing the first allowed NSSAI and the second URSP, when starting an APP in the VPLMN, the user equipment initiates a session establishment procedure to a network side by carrying S-NSSAI of a network slice corresponding to the APP in the second URSP.

Therefore, in a process in which the user equipment registers with the VPLMN, when the first AMF network element selected by the RAN device does not support the network slice corresponding to the NSSAI requested by the user equipment, the user equipment may obtain the second URSP of the VPLMN according to the method in this embodiment of the present invention. The second URSP further includes an APP that does not exist in the first URSP of the HPLMN but can be used in an LBO scenario of the VPLMN. The user equipment may use more APPs in the LBO scenario of the VPLMN based on the second URSP obtained in this solution, thereby improving user experience.

In addition, in this solution, the user equipment may obtain the second URSP in a registration process. Compared with a method in which the user equipment generates the second URSP based on the received first URSP of the HPLMN and the roaming agreement between the VPLMN and the HPLMN, the user equipment does not need to perceive the roaming agreement on the network side. This enhances network security.

Figure 6A:
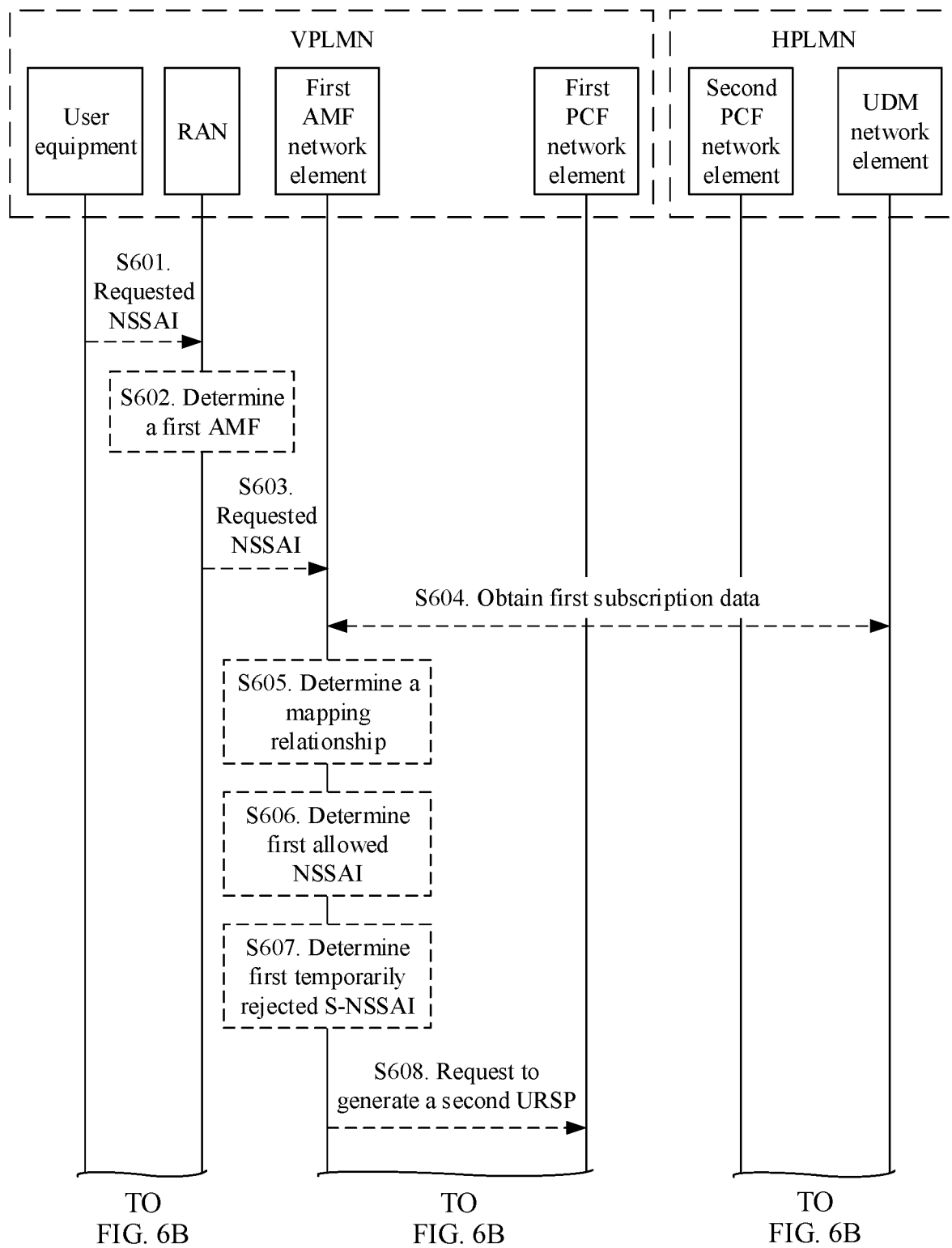
FIG. 6A and FIG. 6B are a signaling interaction diagram of another UE policy obtaining method according to an embodiment of this application.
Figure 6B:
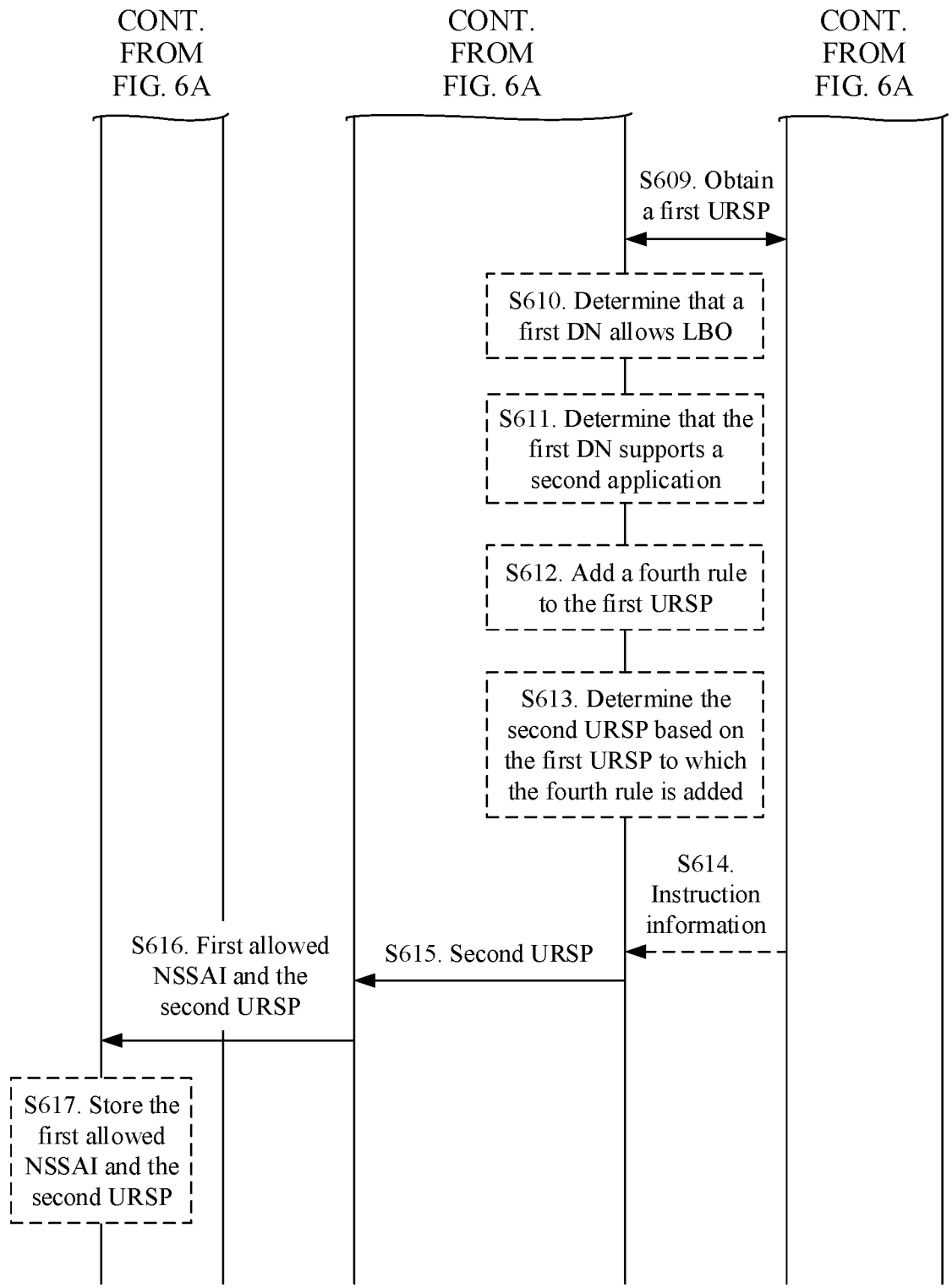

FIG. 6A and FIG. 6B are a signaling interaction diagram of another URSP obtaining method according to an embodiment of this application. An application scenario of the method is the same as that of the embodiment shown in FIG. 5A and FIG. 5B. A difference between the embodiment shown in FIG. 6A and FIG. 6B and the embodiment shown in FIG. 5A and FIG. 5B is that the first AMF network element does not support the network slice corresponding to the NSSAI requested by the user equipment in the embodiment shown in FIG. 5A and FIG. 5B, but the first AMF network element supports the network slice corresponding to the NSSAI requested by the user equipment in the embodiment in FIG. 6A and FIG. 6B. FIG. 6A and FIG. 6B are described with reference to FIG. 5A and FIG. 5B.

For S601 to S604, refer to descriptions of S501 to S504 in FIG. 5A. Details are not described herein again.

S605. The first AMF network element determines a mapping relationship.

For example, when the HPLMN and the VPLMN use different S-NSSAI, the first AMF network element generates the mapping relationship based on a roaming protocol between the VPLMN and the HPLMN. The mapping relationship is a mapping relationship between the S-NSSAI in the HPLMN and the S-NSSAI in the VPLMN.

S606. The first AMF network element determines first allowed NSSAI. S-NSSAI included in the first allowed NSSAI is S-NSSAI of a network slice that can be used by the user equipment in the VPLMN.

Because the first AMF network element supports the network slice corresponding to the NSSAI requested by the user equipment, starting from S607, the first AMF network element may perform an operation similar to that of the second AMF network element in FIG. 5A and FIG. 5B, for example:

S607. The first AMF network element determines first temporarily rejected S-NSSAI.

For S607 in which the first AMF network element determines the first temporarily rejected S-NSSAI, refer to the description of S507 in which the second AMF network element determines the first temporarily rejected S-NSSAI in FIG. 5A. Details are not described herein again.

S608. The first AMF network element sends the mapping relationship to the first PCF network element, and correspondingly, the first PCF network element receives the mapping relationship from the first AMF network element.

For S608 in which the first AMF network element sends the mapping relationship to the first PCF network element, refer to the description of S508 in which the second AMF network element sends the mapping relationship to the first PCF network element in FIG. 5A. Details are not described herein again.

For S609 to S614, refer to descriptions of S509 to S514 in FIG. 5B. Details are not described herein again.

S615. The first PCF network element sends the second URSP to the first AMF network element, and correspondingly, the first AMF network element receives the second URSP from the first PCF network element.

S616. The first AMF network element sends the first allowed NSSAI and the second URSP to the user equipment. Correspondingly, the user equipment receives the first allowed NS SAI and the second URSP from the first AMF network element.

For S616 in which the first AMF network element sends the first allowed NSSAI and the second URSP to the user equipment, refer to the description in S516 in which the second AMF network element sends the first allowed NSSAI and the second URSP to the user equipment in FIG. 5B. Details are not described herein again.

For S617, refer to descriptions of S517 in FIG. 5B. Details are not described herein again.

Therefore, in a process in which the user equipment registers with the VPLMN, when the first AMF network element selected by the RAN device supports the network slice corresponding to the NSSAI requested by the user equipment, the user equipment may obtain the second URSP of the VPLMN according to the method in this embodiment of the present invention. The second URSP further includes an APP that does not exist in the first URSP of the HPLMN but can be used in an LBO scenario of the VPLMN. The user equipment may use more APPs in the LBO scenario of the VPLMN based on the second URSP obtained in this solution, thereby improving user experience. In addition, in this solution, the user equipment may obtain the second URSP in a registration process. Compared with a method in which the user equipment generates the second URSP based on the received first URSP of the HPLMN and the roaming agreement between the VPLMN and the HPLMN, the user equipment does not need to perceive the roaming agreement on the network side. This enhances network security.

Figure 7A:
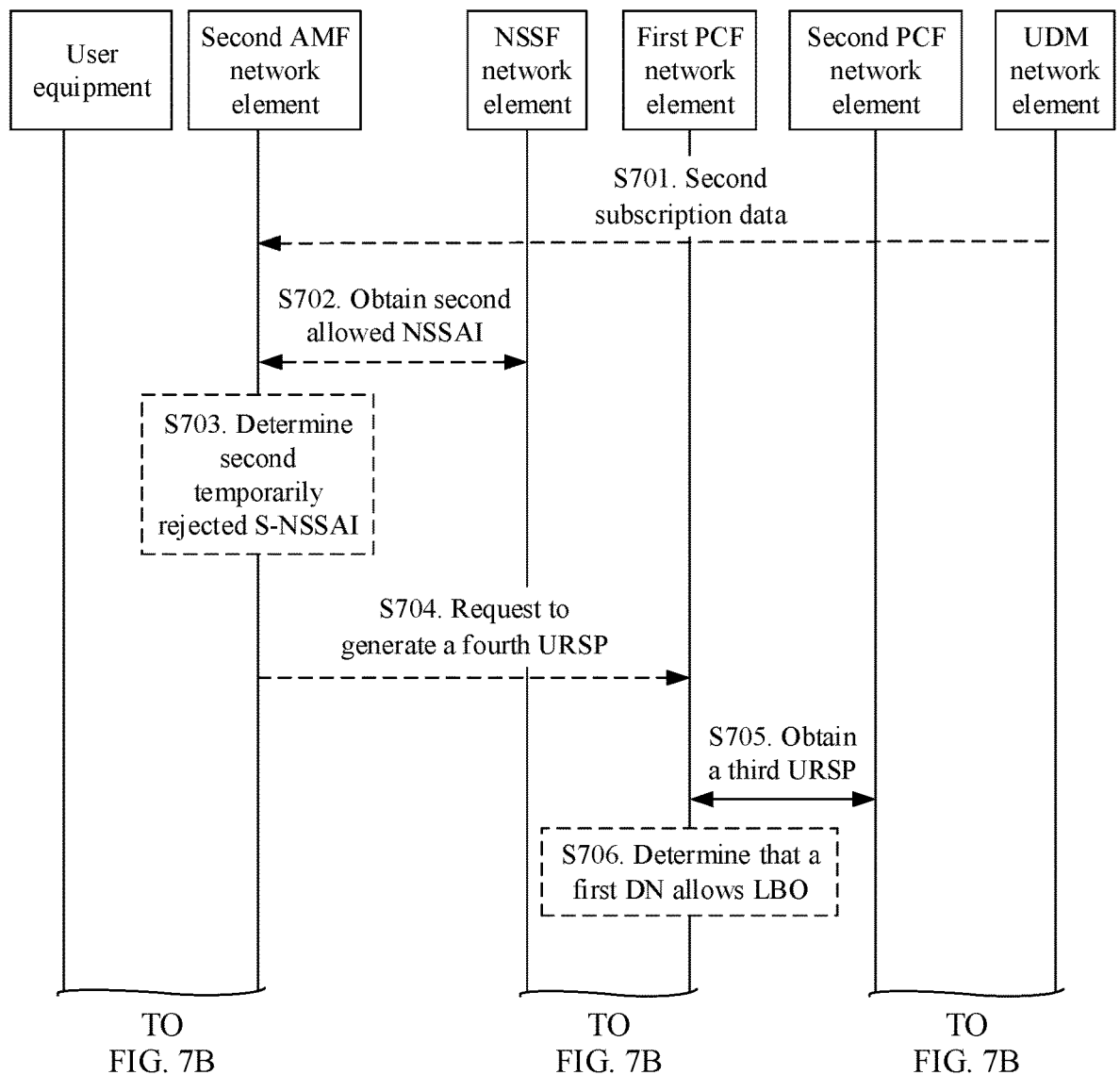
FIG. 7A and FIG. 7B are a signaling interaction diagram of another UE policy obtaining method according to an embodiment of this application.
Figure 7B:
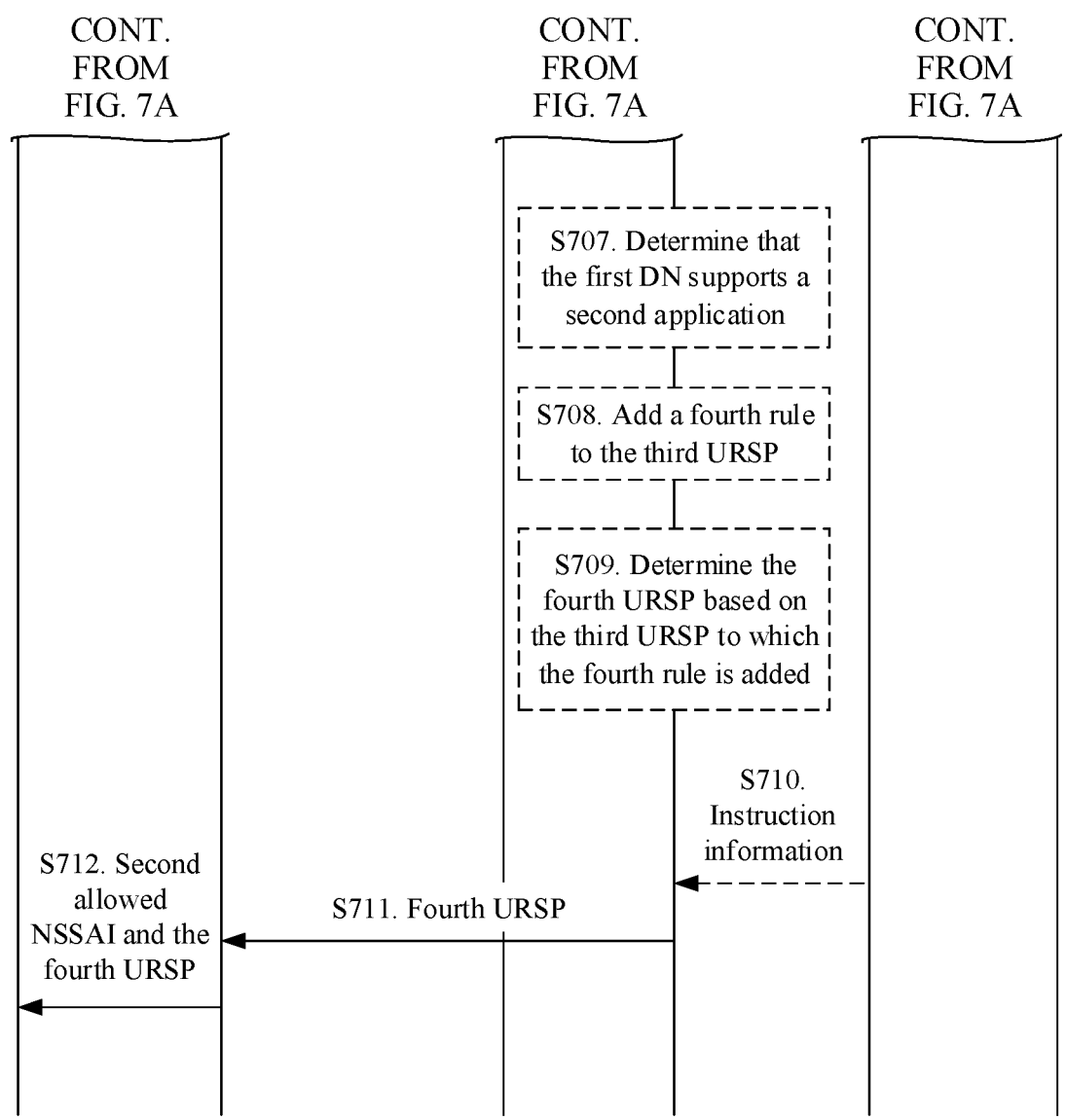

FIG. 7A and FIG. 7B are a flowchart of another URSP obtaining method according to an embodiment of this application. The method may be used in a scenario in which user equipment obtains a URSP of a VPLMN when subscription information of the user equipment changes. FIG. 7A and FIG. 7B are described with reference to FIG. 5A and FIG. 5B.

S701. A UDM network element in an HPLMN sends second subscription data to a second AMF network element, and correspondingly, the second AMF network element receives the second subscription data from the UDM network element. The second subscription data is updated subscription data of the first subscription data.

For example, the UDM network element in the HPLMN may send the second subscription data to the second AMF network element by sending a message or by invoking a service. For example, the UDM network element sends the second subscription data by invoking a Nudm Subscriber-Data Get response service.

For example, the second AMF network element subscribes to subscription data. After the subscription data is updated, the UDM network element sends, to the second AMF network element, the updated second subscription data of the first subscription data. It is assumed that the first subscription data is shown in Table 16, and the updated second subscription data is shown in Table 18. In an example of Table 18, second subscribed S-NSSAIs include S-NSSAI 1, S-NSSAI 2, and S-NSSAI 3. The S-NSSAI 1 corresponds to a DNN 1, the S-NSSAI 2 corresponds to a DNN 2 and a DNN 3, and the S-NSSAI 3 corresponds to a DNN 4. Compared with the first subscription data in Table 16, an association between the S-NSSAI 3 and the DNN 4 is increased in the second subscription data.

TABLE 18

| Subscribed S-NSSAIs | DNN |
| --- | --- |
| S-NSSAI 1 | DNN 1 |
| S-NSSAI 2 | DNN 2 and DNN 3 |
| S-NSSAI 3 | DNN 4 |

S702. The second AMF network element obtains second allowed NSSAI from an NSSF network element in the VPLMN. The second allowed NS SAI is updated allowed NSSAI.

For example, for S703 to S713, refer to descriptions of S507 to S517 in FIG. 5A and FIG. 5B. Details are not described herein again. In S703 to S713, the second temporarily rejected S-NSSAI is updated temporarily rejected S-NSSAI, a third URSP is an updated URSP of the first URSP, and a fourth URSP is an updated URSP of the second URSP.

Therefore, according to the method in this embodiment of the present invention, when the subscription information of the user equipment changes, the first policy control function network element may generate the new second URSP, namely, the fourth URSP, by using the updated third URSP of the first URSP and an updated first mapping relationship, and send the fourth URSP to the user equipment. After the subscription information is updated, the user equipment can obtain the fourth URSP, and obtain, based on the fourth URSP, updated information about an APP that can be used locally, thereby improving user experience.

In the foregoing description, a rule (for example, any one of the first to the sixth rules) used to indicate an association between network slice identification information, an application, and data network identification information may be implemented by using a correspondence between the network slice identification information, the application, and the data network identification information, or may be implemented by using a combination of correspondences between any two of the network slice identification information, the application, and the data network identification information (for example, a correspondence between the network slice identification information and the application and a correspondence between the application and the data network name). This is not limited in this application.

In the foregoing embodiments provided in this application, the solutions of the communication method provided in the embodiments of this application are separately described from a perspective of the network elements and from a perspective of interaction between the network elements. It can be understood that to implement the foregoing functions, network elements, for example, the first PCF network element, the second PCF network element, and the AMF network element, include a corresponding hardware structure and/or a corresponding software module for performing the functions. A person of ordinary skill in the art should easily be aware that, in combination with the examples described in the embodiments disclosed in this specification, units, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 8A:
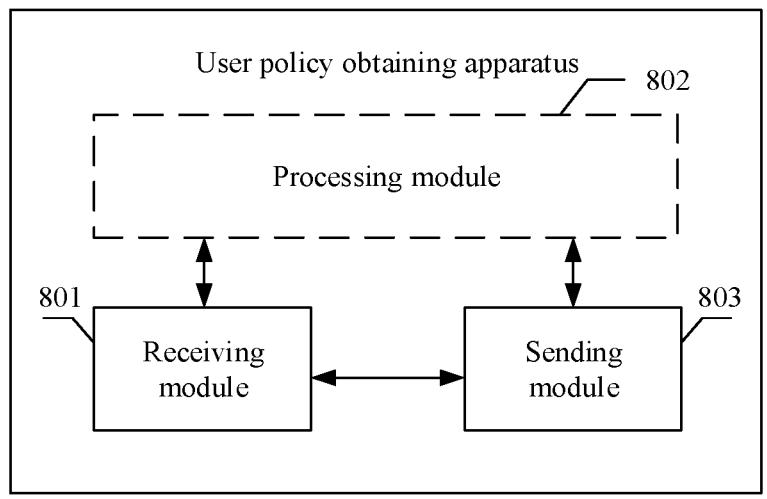
FIG. 8A and FIG. 8B are schematic structural diagrams of a UE policy obtaining apparatus according to an embodiment of this application.

For example, when the foregoing network elements implement the corresponding functions by using the software modules, a UE policy obtaining apparatus may include a receiving module 801 and a sending module 803, as shown in FIG. 8A. Optionally, the UE policy obtaining apparatus further includes a processing module 802.

In an embodiment, the UE policy obtaining apparatus may be configured to perform operations of the first policy control function network element (for example, the first PCF network element) in FIG. 2 to FIG. 7B, for example:

The receiving module 801 is configured to receive a first UE policy of an HPLMN from a policy control function network element in the HPLMN. The first UE policy includes a first rule. The first rule is used to indicate an association between first network slice identification information, a first application, and first data network identification information, and the first data network identification information is used to identify a first data network. The first data network allows LBO and supports the first application and a second application. The sending module 803 is configured to send a second UE policy of a VPLMN to user equipment. The second UE policy includes a second rule and a third rule, the second rule is used to indicate an association between second network slice identification information, the first application, and the first data network identification information, and the third rule is used to indicate an association between the second network slice identification information, the second application, and the first data network identification information.

Therefore, according to the UE policy obtaining apparatus in this embodiment of the present invention, the second URSP of the VPLMN that is obtained by the user equipment includes information about an APP that does not exist in the first URSP of the HPLMN but can be used in an LBO scenario of the VPLMN, for example, information about the second application. The user equipment may use more APP services in the LBO scenario of the VPLMN based on the obtained second URSP, thereby improving user experience.

Optionally, the sending module 803 is further configured to send an identifier of the VPLMN to the user equipment, where the identifier of the VPLMN is associated with the second UE policy.

Optionally, the sending module 803 is further configured to send the first UE policy and an identifier of the HPLMN to the user equipment, where the identifier of the HPLMN is associated with the first UE policy.

Optionally, before the sending module 803 sends the first UE policy and the identifier of the HPLMN to the user equipment, the receiving module 801 is further configured to receive instruction information from the policy control function network element, where the instruction information is used to trigger sending of the first UE policy and the identifier of the HPLMN to the user equipment.

Optionally, the processing module 802 is configured to add a fourth rule to the first UE policy. The fourth rule includes an association between the first network slice identification information, the second application, and the first data network identification information, and the processing module is further configured to determine the second UE policy based on the first UE policy to which the fourth rule is added.

Optionally, the processing module 802 is further configured to determine that the first data network allows LBO, and determine that the first data network supports the second application.

Optionally, when the second network slice identification information is the same as the first network slice identification information, the second UE policy is the first UE policy to which the fourth rule is added.

Optionally, when the second network slice identification information corresponds to the first network slice identification information, the receiving module 801 is configured to receive a first mapping relationship between the first network slice identification information and the second network slice identification information from an access and mobility management function network element in the VPLMN. The processing module 802 is configured to determine the second UE policy based on the first mapping relationship and the first UE policy to which the fourth rule is added.

Optionally, the processing module 802 is configured to map, to the second network slice identification information based on the first mapping relationship, the first network slice identification information in the first UE policy to which the fourth rule is added, to generate the second UE policy.

Optionally, the receiving module 801 is further configured to receive a first mapping relationship between the first network slice identification information and the second network slice identification information from an access and mobility management function network element in the VPLMN, where the first mapping relationship is used to generate the second UE policy.

Optionally, the first UE policy further includes a fifth rule, the fifth rule is used to indicate an association between third network slice identification information, a third application, and second data network identification information, the second data network identification information is used to identify a second data network, and the second data network prohibits LBO. The second UE policy further includes a sixth rule, the sixth rule is used to indicate an association between fourth network slice identification information, the third application, and the second data network identification information, and the fourth network slice identification information is the same as the third network slice identification information.

Optionally, the first UE policy further includes a fifth rule, the fifth rule is used to indicate an association between third network slice identification information, a third application, and second data network identification information, the second data network identification information is used to identify a second data network, and the second data network prohibits LBO. The second UE policy further includes a sixth rule, the sixth rule is used to indicate an association between fourth network slice identification information, the third application, and the second data network identification information, and the fourth network slice identification information corresponds to the third network slice identification information.

Optionally, the receiving module 801 is further configured to receive a second mapping relationship between the third network slice identification information and the fourth network slice identification information from the access and mobility management function network element in the VPLMN. The processing module 802 is further configured to determine the fourth network slice identification information based on the third network slice identification information and the second mapping relationship.

In addition, the receiving module 801, the processing module 802, and the sending module 803 in the UE policy obtaining apparatus may further implement other operations or functions of the first policy control function network element in the foregoing methods. Details are not described herein again.

In another embodiment, the UE policy obtaining apparatus shown in FIG. 8A may be configured to perform operations of the second policy control function network element (for example, the second PCF network element) in FIG. 4, for example:

The sending module 803 is configured to send a UE policy of an HPLMN to a first policy control function network element in a VPLMN, and is further configured to send instruction information to the first policy control function network element. The instruction information is used to trigger the sending module 803 to send the UE policy of the HPLMN and an identifier of the HPLMN to user equipment. The identifier of the HPLMN is associated with the UE policy of the HPLMN.

Therefore, the first policy control function network element in the VPLMN can receive the UE policy of the HPLMN, and generate a UE policy of the VPLMN based on the UE policy of the HPLMN. The UE policy of the VPLMN includes information about an APP that does not exist in the UE policy of the HPLMN but can be used in an LBO scenario of the VPLMN. The user equipment may use more APP services in the LBO scenario of the VPLMN based on the obtained second UE policy, thereby improving user experience. In addition, after being triggered by the instruction information, the policy control function network element in the VPLMN sends the UE policy and the identifier of the HPLMN to the user equipment, so that the user equipment is prevented from repeatedly obtaining the UE policy of the HPLMN, and interaction between the user equipment and the network can be reduced, thereby reducing a latency.

In addition, the receiving module 801, the processing module 802, and the sending module 803 in the UE policy obtaining apparatus may further implement other operations or functions of the second policy control function network element in the foregoing methods. Details are not described herein again.

In still another embodiment, the UE policy obtaining apparatus shown in FIG. 8A may be configured to perform operations of the access and mobility management function network element (for example, the AMF network element) in FIG. 3, for example:

The sending module 803 is configured to send a mapping relationship between first network slice identification information and second network slice identification information to a first policy control function network element. The first network slice identification information is network slice identification information that is in an HPLMN and that is supported by a data network, the second network slice identification information is network slice identification information that is in the VPLMN and that is supported by the data network, and the mapping relationship is used to determine the second network slice identification information.

In the prior art, the user equipment needs to obtain the mapping relationship between the first network slice identification information and the second network slice identification information from the access and mobility management function network element in the VPLMN, to generate a second UE policy. According to the prior art, the user equipment perceives a roaming agreement between the VPLMN and the HPLMN by using the mapping relationship. However, according to the foregoing method provided in this application, the user equipment obtains the second UE policy from a network side, so that the user equipment does not need to perceive the roaming agreement between the VPLMN and the HPLMN, thereby improving network security performance.

In addition, the receiving module 801, the processing module 802, and the sending module 803 in the UE policy obtaining apparatus may further implement other operations or functions of the access and mobility management function network element in the foregoing methods. Details are not described herein again.

Figure 8B:
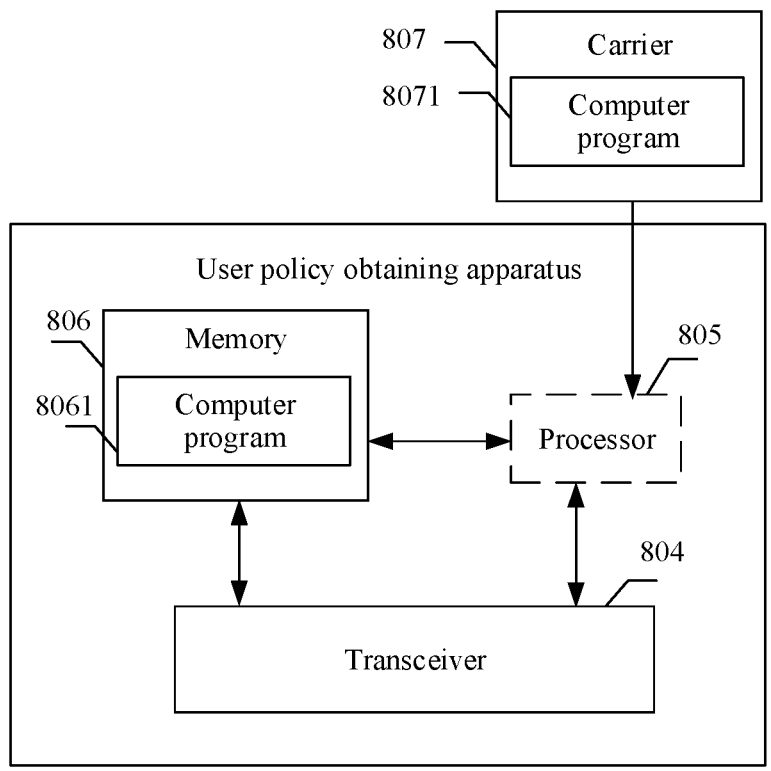

FIG. 8B is another possible schematic structural diagram of the UE policy obtaining apparatus in the foregoing embodiments. The UE policy obtaining apparatus includes a transceiver 804 and a processor 805, as shown in FIG. 8B. For example, the processor 805 may be a general-purpose microprocessor, a data processing circuit, an application-specific integrated circuit (ASIC), or a field programmable gate array (FPGA) circuit. The UE policy obtaining apparatus may further include a memory 806. For example, the memory is a random access memory (RAM). The memory is configured to be coupled to the processor 805, and the memory stores a computer program 8061 necessary for the UE policy obtaining apparatus.

In addition, the UE policy obtaining apparatus in the foregoing embodiments further provides a carrier 807. The carrier stores a computer program 8071 of the UE policy obtaining apparatus, and the computer program 8071 may be loaded into the processor 805. The carrier may be an optical signal, an electrical signal, an electromagnetic signal, or a computer-readable storage medium (for example, a hard disk).

When the computer program 8061 or 8071 is run on a computer (for example, the processor 805), the computer may be enabled to perform the foregoing methods.

For example, in an embodiment, the processor 805 is configured to perform another operation or function of a first policy control function network element. The transceiver 804 is configured to implement communication between the UE policy obtaining apparatus and a second policy control function network element/an access and mobility management function network element/user equipment.

In another embodiment, the processor 805 is configured to perform another operation or function of a second policy control function network element. The transceiver 804 is configured to implement communication between the UE policy obtaining apparatus and a policy control function network element in a VPLMN.

In another embodiment, the processor 805 is configured as a communications apparatus to perform a corresponding function of a AMF network element in the foregoing method. The transceiver 804 is configured to implement communication between the UE policy obtaining apparatus and a first policy control function network element.

A controller/processor configured to perform the foregoing radio access network device in this application may be a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

Methods or algorithm steps described in combination with the content disclosed in this application may be implemented by hardware, or may be implemented by a processor by executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the radio access network device. Certainly, the processor and the storage medium may alternatively exist in the radio access network device as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A user equipment (UE) policy obtaining method, comprising:

receiving, by a first policy control function network element in a visited public land mobile network (VPLMN), a first UE policy of a home public land mobile network (HPLMN) from a second policy control function network element in the HPLMN, wherein the first UE policy comprises a first rule, the first rule being used to indicate an association between first network slice identification information, a first application, and first data network identification information, the first data network identification information being used to identify a first data network, and the first data network allowing local break-out (LBO) and supporting the first application and a second application; and sending, by the first policy control function network element, a second UE policy of the VPLMN to user equipment, wherein the second UE policy comprises a second rule and a third rule, the second rule being used to indicate an association between second network slice identification information, the first application, and the first data network identification information, and the third rule being used to indicate an association between the second network slice identification information, the second application, and the first data network identification information.

2. The method according to claim 1, further comprising: sending, by the first policy control function network element, an identifier of the VPLMN to the user equipment, wherein the identifier of the VPLMN is associated with the second UE policy.

3. The method according to claim 2, further comprising: sending, by the first policy control function network element, the first UE policy and an identifier of the HPLMN to the user equipment, wherein the identifier of the HPLMN is associated with the first UE policy.

4. The method according to claim 3, wherein before the sending, by the first policy control function network element, of the first UE policy and the identifier of the HPLMN to the user equipment, the method further comprises: receiving, by the first policy control function network element, instruction information from the second policy control function network element, the instruction information being used to trigger the sending of the first UE policy and the identifier of the HPLMN to the user equipment.

5. The method according to claim 1, further comprising: adding, by the first policy control function network element, a fourth rule to the first UE policy, wherein the fourth rule comprises an association between the first network slice identification information, the second application, and the first data network identification information; and
determining, by the first policy control function network element, the second UE policy based on the first UE policy to which the fourth rule is added.

6. The method according to claim 1, further comprising: determining, by the first policy control function network element, that the first data network allows LBO; and
determining, by the first policy control function network element, that the first data network supports the second application.

7. The method according to claim 5, wherein with the second network slice identification information being the same as the first network slice identification information, the second UE policy is the first UE policy to which the fourth rule is added.

8. The method according to claim 5, wherein with the second network slice identification information corresponding to the first network slice identification information, the determining, by the first policy control function network element, of the second UE policy based on the first UE policy to which the fourth rule is added comprises:
receiving, by the first policy control function network element, a first mapping relationship between the first network slice identification information and the second network slice identification information from an access and mobility management function network element in the VPLMN; and
determining, by the first policy control function network element, the second UE policy based on the first mapping relationship and the first UE policy to which the fourth rule is added.

9. The method according to claim 8, wherein the determining, by the first policy control function network element, of the second UE policy based on the first mapping relationship and the first UE policy to which the fourth rule is added comprises:
mapping, by the first policy control function network element to the second network slice identification information based on the first mapping relationship, the first network slice identification information in the first UE policy to which the fourth rule is added, to generate the second UE policy.

10. A user equipment (UE) policy obtaining apparatus, comprising a memory and a processor connected to the memory, the processor being configured to:
receive a first UE policy of a home public land mobile network (HPLMN) from a policy control function network element in the HPLMN, wherein the first UE policy comprises a first rule, the first rule being used to indicate an association between first network slice identification information, a first application, and first data network identification information, the first data network identification information being used to identify a first data network, and the first data network allowing local break-out (LBO) and supports the first application and a second application; and
send a second UE policy of a visited public land mobile network (VPLMN) to user equipment, wherein the second UE policy comprises a second rule and a third rule, the second rule being used to indicate an association between second network slice identification information, the first application, and the first data network identification information, and the third rule being used to indicate an association between the second network slice identification information, the second application, and the first data network identification information.

11. The UE policy obtaining apparatus according to claim 10, wherein the processor is further configured to send an identifier of the VPLMN to the user equipment, wherein the identifier of the VPLMN is associated with the second UE policy.

12. The UE policy obtaining apparatus according to claim 11, wherein the processor is further configured to send the first UE policy and an identifier of the HPLMN to the user equipment, wherein the identifier of the HPLMN is associated with the first UE policy.

13. The UE policy obtaining apparatus according to claim 12, wherein before the processor sends the first UE policy and the identifier of the HPLMN to the user equipment, the processor is further configured to receive instruction information from the policy control function network element, the instruction information being used to trigger the sending of the first UE policy and the identifier of the HPLMN to the user equipment.

14. The UE policy obtaining apparatus according to claim 10, wherein the processor is further configured to:
add a fourth rule to the first UE policy, wherein the fourth rule comprises an association between the first network slice identification information, the second application, and the first data network identification information; and
determine the second UE policy based on the first UE policy to which the fourth rule is added.

15. The UE policy obtaining apparatus according to claim 14, wherein the processor is further configured to:
determine that the first data network allows LBO; and
determine that the first data network supports the second application.

16. The UE policy obtaining apparatus according to claim 14, wherein with the second network slice identification information being the same as the first network slice identification information, the second UE policy is the first UE policy to which the fourth rule is added.

17. The UE policy obtaining apparatus according to claim 14, wherein with the second network slice identification information corresponding to the first network slice identification information, the processor is further configured to:
receive a first mapping relationship between the first network slice identification information and the second network slice identification information from an access and mobility management function network element in the VPLMN; and
determine the second UE policy based on the first mapping relationship and the first UE policy to which the fourth rule is added.

18. The UE policy obtaining apparatus according to claim 17, wherein the processor is further configured to map, to the second network slice identification information based on the first mapping relationship, the first network slice identification information in the first UE policy to which the fourth rule is added, to generate the second UE policy.

19. A user equipment (UE) policy obtaining system, comprising:
a second policy control function network element in a home public land mobile network (HPLMN), configured to send a first UE policy of the HPLMN, wherein the first UE policy comprises a first rule, the first rule being used to indicate an association between first network slice identification information, a first application, and first data network identification information, the first data network identification information being used to identify a first data network, and the first data network allowing local break-out (LBO) and supporting the first application and a second application; and
a first policy control function network element in a visited public land mobile network (VPLMN), configured to receive the first UE policy from the second policy control function network element and send a second UE policy of the VPLMN, wherein the second UE policy comprises a second rule and a third rule, the second rule being used to indicate an association between second network slice identification information, the first application, and the first data network identification information, and the third rule being used to indicate an association between the second network slice identification information, the second application, and the first data network identification information.

20. The UE policy obtaining system according to claim 19, further comprising:
user equipment, configured to receive the second UE policy from the first policy control function network element.

* * * * *